United States Patent
Sun et al.

(10) Patent No.: US 10,667,139 B2
(45) Date of Patent: May 26, 2020

(54) FREQUENCY SPECTRUM MANAGEMENT DEVICE, ELECTRONIC DEVICE, AND METHOD EXECUTED THEREBY

(71) Applicants: Sony Corporation, Tokyo (JP); Chen Sun, Beijing (CN); Xin Guo, Beijing (CN)

(72) Inventors: Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/346,545

(22) PCT Filed: Dec. 13, 2017

(86) PCT No.: PCT/CN2017/115853
§ 371 (c)(1),
(2) Date: May 1, 2019

(87) PCT Pub. No.: WO2018/130040
PCT Pub. Date: Jul. 19, 2018

(65) Prior Publication Data
US 2020/0059790 A1    Feb. 20, 2020

(30) Foreign Application Priority Data
Jan. 13, 2017 (CN) .......................... 2017 1 0026388

(51) Int. Cl.
*H04W 16/10* (2009.01)
*H04L 5/00* (2006.01)
*H04W 16/14* (2009.01)

(52) U.S. Cl.
CPC ........... *H04W 16/10* (2013.01); *H04L 5/0062* (2013.01); *H04W 16/14* (2013.01)

(58) Field of Classification Search
CPC ....................... H04W 16/02–14; H04L 5/0062
See application file for complete search history.

(56) References Cited

U.S. PATENT DOCUMENTS

2014/0341150 A1* 11/2014 Kimura .................. H04W 4/00
                                                                    370/329
2015/0189665 A1*  7/2015 Sun ....................... H04W 16/14
                                                                    370/329

FOREIGN PATENT DOCUMENTS

| CN | 104113888 A | 10/2014 |
|----|-------------|---------|
| CN | 106131858 A | 11/2016 |
| EP | 1 883 258 A1 | 1/2008 |

OTHER PUBLICATIONS

International Search Report and Written Opinion dated Feb. 26, 2018 for PCT/CN2017/115853 filed on Dec. 13, 2017, 9 pages including English Translation of the International Search Report.

* cited by examiner

*Primary Examiner* — Raymond S Dean
(74) *Attorney, Agent, or Firm* — Xsensus LLP

(57) ABSTRACT

A frequency spectrum management device includes a processing circuit and is configured so that: a first subsystem manages the frequency spectrum management device, an allocation coefficient between other subsystems and the first subsystem is determined on the basis of the distances from the first subsystem and the other subsystems to a main system, the allocation coefficient expresses the degree of interference of aggregated interference that the other subsystems and the first subsystem produce with respect to the main system; and a frequency spectrum resource is allocated to the first subsystem on the basis of the allocation coefficient. The use of the frequency spectrum management device, the electronic device, and the method executed thereby of the present disclosure increases the degree of rationality of frequency spectrum resource allocation for the subsystems.

17 Claims, 13 Drawing Sheets

FREQUENCY SPECTRUM MANAGEMENT DEVICE, ELECTRONIC DEVICE, AND METHOD EXECUTED THEREBY

CROSS-REFERENCE TO RELATED APPLICATIONS

This application is based on PCT filing PCT/CN2017/115853, filed Dec. 13, 2017, which claims the priority to Chinese Patent Application No. 201710026388.6, titled "FREQUENCY SPECTRUM MANAGEMENT DEVICE, ELECTRONIC DEVICE, AND METHOD EXECUTED THEREBY", filed with the Chinese Patent Office on Jan. 13, 2017, the entire contents of each are incorporated herein by reference.

FIELD

Embodiments of the present disclosure generally relate to the technical field of wireless communications, in particular to frequency spectrum resource management in wireless communication systems using cognitive radio technology, and more particularly to a frequency spectrum management device, an electronic device for a secondary system, a method performed by a frequency spectrum management device, and a method performed by an electronic device for a secondary system.

BACKGROUND

With the development of wireless communication technology, users demand new services having high quality and high speed. Wireless communication operators and device manufacturers need to continuously improve systems to meet the demands of the users. In this case, a large amount of frequency spectrum resources are required to support the new services and meet requirements of high speed communications. The frequency spectrum resources may be quantized by parameters such as time, frequency, band width, maximum allowable transmission power. Currently, limited frequency spectrum resources have been allocated to fixed operators and services, a new available frequency spectrum is very rare or expensive. In this case, a concept of dynamic frequency spectrum usage is proposed, in which frequency resources that have been allocated to certain services but are not utilized sufficiently are utilized dynamically.

As an intelligent evolution of software radio technology, the cognitive radio (CR) technology enables an unlicensed user to dynamically access a licensed frequency spectrum according to certain rules, which greatly improves actual frequency spectrum utilization efficiency. It may be considered that a cognitive radio system includes a primary system and a secondary system, where a system that is licensed to use the frequency spectrum serves as the primary system, and an unlicensed communication system that can dynamically access the licensed frequency spectrum according to certain rules serves as the secondary system. Alternatively, the secondary system may also be a system having a frequency spectrum usage right but having a lower frequency spectrum utilization priority than the primary system. In addition, a functional module called as a spectrum coordinator (SC) and a functional module called as a geographic location database (DB) may further be arranged in a region to manage the secondary system and distribute a resource for the secondary system.

The communication mode in which the primary system and the secondary system coexist requires that the secondary system does not adversely affect the primary system, or the impact generated by the secondary system is controlled within the tolerance of the primary system. In a case that there are multiple secondary systems, aggregation interference generated by the secondary systems cannot exceed the interference tolerance range of the primary system. Therefore, it is desired to propose a mechanism for frequency spectrum distribution, so that the frequency spectrum distribution for the secondary system is more reasonable so as to improve the frequency spectrum utilization efficiency.

SUMMARY

This part provides an overview of the present disclosure, rather than a full scope or all features of the present disclosure.

An object of the present disclosure is to provide a mechanism for frequency spectrum distribution, so that the frequency spectrum distribution for a secondary system is more reasonable so as to improve frequency spectrum utilization efficiency.

According to an aspect of the present disclosure, a frequency spectrum management device is provided. The frequency spectrum management device includes a processing circuit. The processing circuit is configured to: determine, with respect to a first secondary system managed by the frequency spectrum management device, according to distances from the first secondary system and an other secondary system to a primary system, a distribution coefficient between the other secondary system and the first secondary system, the distribution coefficient representing an interference degree of aggregation interference generated by the other secondary system and the first secondary system against the primary system; and distribute a frequency spectrum resource for the first secondary system according to the distribution coefficient.

According to another aspect of the present disclosure, an electronic device for a secondary system is provided. The electronic device includes a processing circuit. The processing circuit is configured to: receive frequency spectrum resource information from a frequency spectrum management device managing the secondary system; and obtain a frequency spectrum resource according to the frequency spectrum resource information, where the frequency spectrum resource is distributed by the frequency spectrum management device for the electronic device according to a distribution coefficient between an other secondary system and the secondary system where the electronic device is located, the distribution coefficient is determined according to distances from the other secondary system and the secondary system where the electronic device is located to a primary system, and the distribution coefficient represents an interference degree of aggregation interference generated by the other secondary system and the secondary system where the electronic device is located against the primary system.

According to another aspect of the present disclosure, a method performed by a frequency spectrum management device is provided. The method includes: determining, with respect to a first secondary system managed by the frequency spectrum management device, according to distances from the first secondary system and an other secondary system to a primary system, a distribution coefficient between the other secondary system and the first secondary system, the distribution coefficient representing an interference degree of aggregation interference generated by the other secondary system and the first secondary system against the primary system; and distributing a frequency spectrum resource for the first secondary system according to the distribution coefficient.

According to another aspect of the present disclosure, a method performed by an electronic device for a secondary system is provided. The method includes: receiving frequency spectrum resource information from a frequency spectrum management device managing the secondary system; and obtaining a frequency spectrum resource according to the frequency spectrum resource information, where the frequency spectrum resource is distributed by the frequency spectrum management device for the electronic device according to a distribution coefficient between an other secondary system and the secondary system where the electronic device is located, the distribution coefficient is determined according to distances from the other secondary system and the secondary system where the electronic device is located to a primary system, and the distribution coefficient represents an interference degree of aggregation interference generated by the other secondary system and the secondary system where the electronic device is located against the primary system.

With the frequency spectrum management device, the electronic device for a secondary system, the method performed by a frequency spectrum management device, and the method performed by an electronic device for a secondary system provided in the present disclosure, the frequency spectrum management device can distribute the frequency spectrum resource for the secondary system according to the distribution coefficient. The distribution coefficient is related to distances from the two secondary systems to the primary system, and represents the interference degree of the aggregation interference generated by the two secondary systems against the primary system in a case that the two secondary systems use the frequency spectrum resource on a same frequency band. In this way, different frequency spectrum resources can be distributed for the secondary systems generating strong aggregation interference against the primary system, so that the frequency spectrum distribution for the secondary system is more reasonable, thereby improving the frequency spectrum utilization efficiency.

Further applicability range is apparent from the description provided herein. The descriptions and specific examples in the overview are merely for the purpose of illustration and are not intended to limit the scope of the present disclosure.

BRIEF DESCRIPTION OF THE DRAWINGS

The drawings described herein are provided merely for the purpose of illustrating the selected embodiments rather than all possible embodiments, and are not intended to limit the scope of the present disclosure. In the drawings.

Figure 1:
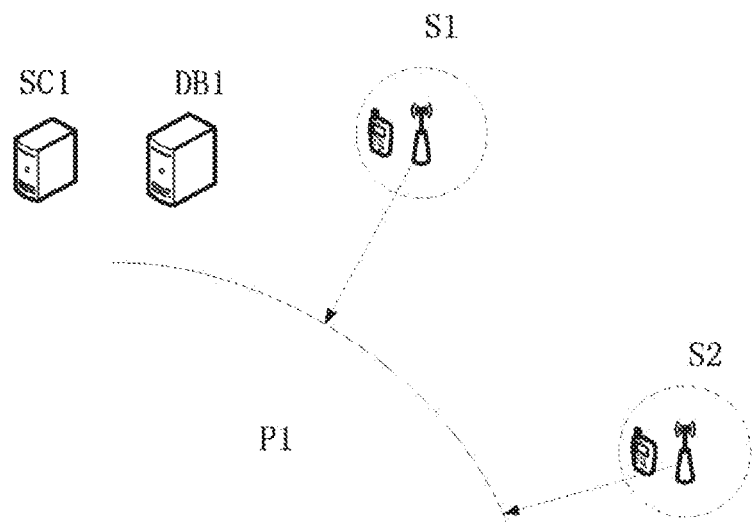
FIG. 1 is a schematic diagram showing an application scenario of the present disclosure.

While specific embodiments of the present disclosure are shown as examples in the drawings and are described herein in detail, various modifications and variations may be made to the present disclosure. It should be understood that the description for the specific embodiments herein is not intended to limit the present disclosure to the disclosed specific forms, and the present disclosure is intended to encompass all modifications, equivalents and alternatives that fall within the spirit and scope of the present disclosure. It should be noted that reference numerals indicate parts corresponding to the reference numerals throughout the drawings.

DETAILED DESCRIPTION OF EMBODIMENTS

Examples of the present disclosure are described more fully with reference to the drawings. The following description is merely exemplary rather than being intended to limit the present disclosure and applications or purposes of the present disclosure.

Exemplary embodiments are provided to make the present disclosure be exhaustive and fully convey the scope of the present disclosure to those skilled in the art. Various specific details such as specific components, devices and methods are set forth to provide thorough understanding for the embodiments of the present disclosure. It is apparent to those skilled in the art that the exemplary embodiments may be embodied in many different forms without the specific details, and the specific details are not interpreted as a limit for the scope of the present disclosure. In some exemplary embodiments, well-known processes, well-known structures and well-known technology are not described in detail.

The present disclosure is described below in the following order:

1. Description of Technical Problem;
2. First Embodiment;
3. Second Embodiment;
4. Third Embodiment;
5. Fourth Embodiment;
6. Fifth Embodiment;
7. Sixth Embodiment;
8. Application Example.

1. Description of Technical Problem

FIG. 1 is a schematic diagram showing an application scenario of the present disclosure. As shown in FIG. 1, coverage of a primary system P1 is indicated by an arc-shaped curve. Two secondary systems S1 and S2 exist outside the boundary of the primary system P1. Further, a frequency spectrum coordinator SC1 and a geographic location database DB1 exist in a region where the primary system P1 is located. The DB1 may calculate frequency spectrum resources available for the secondary systems according to potential interference of the secondary systems S1 and S2 against the primary system P1. The SC1 may manage frequency spectrum usage of the secondary systems S1 and S2 according to the frequency spectrum resources available for the secondary systems S1 and S2, so as to improve frequency spectrum utilization efficiency.

In the system shown in FIG. 1, since the secondary systems S1 and S2 are close to the edge of the primary system P1, the secondary systems S1 and S2 may generate interference against the primary system P1. In this case, the SC1 is required to reasonably distribute the frequency spectrum resources for the secondary systems S1 and S2, such that the interference of the secondary systems S1 and S2 against the primary system P1 can be controlled within a tolerable range. For example, it is assumed that the primary system P1 can tolerate interference of 10 dB. In a case that aggregation interference generated by the secondary systems S1 and S2 against the primary system P1 is 9 dB, if a new secondary system appears at the edge of the primary system P1, the aggregation interference generated by the new secondary system and the secondary systems S1 and S2 against the primary system P1 is likely to exceed 10 dB. In this case, the new secondary system cannot use the frequency spectrum resources of the primary system P1. In addition, in a case that the aggregation interference generated by the secondary systems S1 and S2 against the primary system P1 is small, for example, 5 dB, if a new secondary system appears at the edge of the primary system P1, the aggregation interference generated by the new secondary system and the secondary systems S1 and S2 against the primary system P1 can be less than 10 dB by reasonable distribution. In this case, the new secondary system can use the frequency spectrum resources of the primary system P1. It can be seen that the aggregation interference of the secondary system against the primary system should be as small as possible by using an ideal frequency spectrum distribution method.

In addition, in the system shown in FIG. 1, it is assumed that the secondary systems S1 and S2 belong to different regions, the S1 is managed by the SC1, and the S2 is managed by other SC except the SC1. In the present disclosure, the regions are divided according to geographic locations. For example, the division may be made according to different countries, areas, provinces and cities. Generally, in one region, one SC and one DB are used to manage and distribute the frequency spectrum resources for the secondary systems. In a case that the S1 and the S2 use the same frequency spectrum resource, for example, the frequency spectrum resource of a channel 1 (CH1) in a broadcast television system, if a new secondary system needing to use the frequency spectrum resource of the CH1 appears in the coverage of the SC1, the frequency spectrum usage of the secondary system S1 and the secondary system S2 should be adjusted such that the aggregation interference generated by the new secondary system and the secondary system S1 against the primary system P1 is within a certain range. In this case, since the secondary system S2 is not managed by the SC1, the SC1 is required to coordinate with the SC managing the S2, which results in additional signaling overhead and time overhead. It can be seen that the secondary systems in different regions should use different frequency spectrum resources as much as possible to reduce the signaling interaction between SCs in the different regions by using the ideal frequency spectrum distribution method.

In order to solve at least one of the above technical problems, there are provided a frequency spectrum management device, an electronic device for a geographic location database, an electronic device for a secondary system, and methods performed by these devices according to the present disclosure.

It should be noted that as an application example of the present disclosure, the primary system may be a broadcast television system, and the secondary system may be a mobile communication system such as a wifi communication system. The broadcast television system may include a primary user base station (for example, a television tower) and multiple primary users (for example, televisions). The mobile communication system may include a secondary user base station (for example, a wifi access point) and a secondary user (for example, a portable computer). There may be only secondary users as terminal devices but no base station in the secondary system, and some of the secondary users may have functions of the base station. In this system, a frequency spectrum of a certain channel not broadcasting programs on the digital broadcast television frequency spectrum or a frequency spectrum of an adjacent channel of the certain channel may be used for performing mobile communication such as wifi communication, without causing interference to the reception of television signals.

It should be understood by those skilled in the art that although the above description illustrates the case that the primary system is a broadcast television system, the present disclosure is not limited thereto. The primary system may also be other communication systems having legal frequency spectrum usage rights, and the secondary system may also be other systems that need to use frequency spectrum resources for communication.

2. First Embodiment

Figure 2:
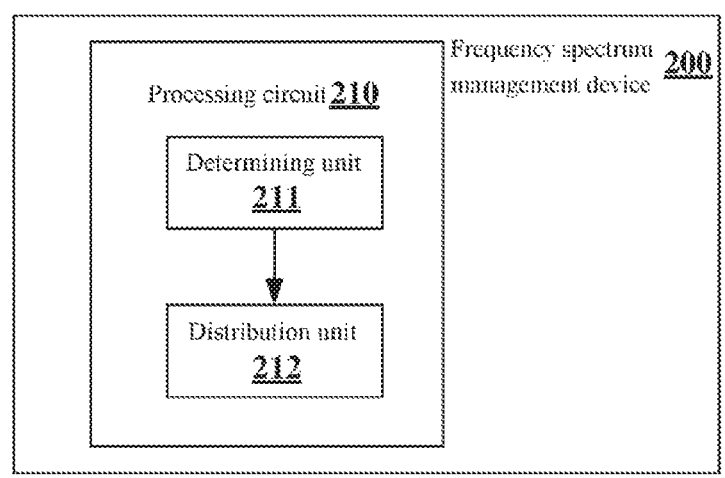
FIG. 2 is a block diagram showing a configuration example of a frequency spectrum management device according to an embodiment of the present disclosure.

In this embodiment, a frequency spectrum management device 200 according to an embodiment of the present disclosure is described in detail. The frequency spectrum management device 200 may be, for example, a frequency spectrum coordinator SC. FIG. 2 is a block diagram showing a configuration example of the frequency spectrum management device 200 according to the embodiment of the present disclosure.

As shown in FIG. 2, the frequency spectrum management device 200 includes a processing circuit 210. It should be noted that the frequency spectrum management device 200 may include one processing circuit 210 or multiple processing circuits 210.

Further, the processing circuit 210 may include various discrete functional units to perform various different functions and/or operations. It should be noted that the functional units may be physical entities or logical entities, and units referred to as different names may be implemented by a same physical entity.

According to an embodiment of the present disclosure, the processing circuit 210 may include a determining unit 211 and a distribution unit 212.

According to an embodiment of the present disclosure, the determining unit 211 may determine, with respect to a first secondary system managed by the frequency spectrum management device 200, according to distances from the first secondary system and an other secondary system to a primary system, a distribution coefficient between the other secondary system and the first secondary system. The distribution coefficient represents an interference degree of aggregation interference generated by the other secondary system and the first secondary system against the primary system.

The first secondary system may be any one of secondary systems within the coverage of the frequency spectrum management device 200, and the other secondary system is a secondary system other than the first secondary system. That is, the determining unit 211 may determine, with respect to any one of the secondary systems managed by the frequency spectrum management device 200, a distribution coefficient between the secondary system and the other secondary system.

The distribution coefficient is a parameter for two secondary systems, which is related to the distances from the two secondary systems to the primary system. The distribution coefficient represents the interference degree of the aggregation interference of the two secondary systems against the primary system in a case that the two secondary systems use the same frequency spectrum resource. According to an embodiment of the present disclosure, the determining unit 211 may determine the distribution coefficient between the other secondary system and the first secondary system, and transmit the determined distribution coefficient to the distribution unit 212.

According to an embodiment of the present disclosure, the distribution unit 212 may distribute a frequency spectrum resource for the first secondary system according to the distribution coefficient. The distribution unit 212 may acquire the distribution coefficient between the first secondary system and the other secondary system from the determining unit 211, and distribute the frequency spectrum resource according to the distribution coefficient.

The first secondary system may be any one of secondary systems within the coverage of the frequency spectrum management device 200, and the other secondary system is a secondary system other than the first secondary system. That is, the distribution unit 212 may distribute a frequency spectrum resource for any one of the secondary systems managed by the frequency spectrum management device 200 according to the distribution coefficient between the secondary system and the other secondary system.

It can be seen from the embodiment of the present disclosure that, the frequency spectrum management device 200 takes the distribution coefficient between the secondary systems into consideration when distributing the frequency spectrum resources, where the distribution coefficient represents the interference degree of the aggregation interference generated by two secondary systems against the primary system. That is, the frequency spectrum management device 200 may distribute frequency spectrum resources for the secondary systems such that the aggregation interference generated by the secondary systems against the primary system is as small as possible.

According to an embodiment of the present disclosure, the determining unit 211 in the processing circuit 210 may determine the distances from the first secondary system and the other secondary system to the primary system according to distances from the first secondary system and the other secondary system to a reference point within the coverage of the primary system. That is, the reference point within the coverage of the primary system may indicate the primary system, and a distance from a secondary system to the reference point may indicate a distance from the secondary system to the primary system where the reference point is located.

According to an embodiment of the present disclosure, the reference point within the coverage of the primary system includes a first reference point corresponding to the first secondary system and a second reference point corresponding to the other secondary system.

Figure 3:
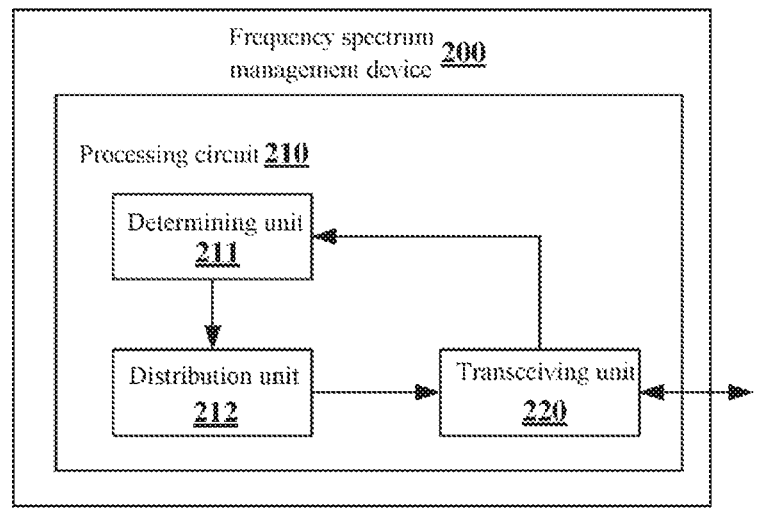
FIG. 3 is a block diagram showing a configuration example of a frequency spectrum management device according to another embodiment of the present disclosure.

FIG. 3 is a block diagram showing a configuration example of a frequency spectrum management device according to another embodiment of the present disclosure. As shown in FIG. 3, the processing circuit 210 of the frequency spectrum management device 200 further includes a transceiving unit 220. The frequency spectrum management device 200 may communicate with other devices including transmitting information and receiving information and the like, via the transceiving unit 220.

According to an embodiment of the present disclosure, the transceiving unit 220 may receive first reference point information and second reference point information.

In the present disclosure, the reference point is a parameter corresponding to a secondary system. Each secondary system may have a corresponding reference point. The reference point corresponding to the secondary system may be the most severely interfered point within coverage of one or more primary systems that are interfered by the secondary system. Various parameters, for example, the distance from the secondary system to the primary system, an interference amount that the primary system can further tolerate, may be used to indicate the interference against the primary system. That is, the reference point corresponding to the secondary system may be a point closest to the secondary system within coverage of one or more primary systems that are interfered by the secondary system, or may be an edge position of one or more primary systems that are interfered by the secondary system, with the minimum amount of interference that can further be tolerated. Generally, the reference point corresponding to the secondary system is within the coverage of the primary system within the region where the secondary system is located, and more specifically, is located at the edge of the primary system. In a case that the secondary system is located at a junction between multiple regions, the secondary system may generate interference to multiple primary systems. In this case, the reference point corresponding to the secondary system is likely to be located within the coverage of other primary systems located in different regions from the secondary system. In addition, different secondary systems generally correspond to different reference points, but the different secondary systems may also correspond to a same reference point. According to an embodiment of the present disclosure, the transceiving unit 220 may receive reference point information of the first secondary system and the other secondary system, and transmit the received reference point information to the processing circuit 210, for example, to the determining unit 211.

According to an embodiment of the present disclosure, the determining unit 211 in the processing circuit 210 may further determine distances from the first secondary system and the other secondary system to the primary system based on the first reference point information and the second reference point information, to determine the distribution coefficient. Specifically, the distances from the first secondary system and the other secondary system to the primary system may include: a distance from the first secondary system to the first reference point, a distance from the first secondary system to the second reference point, a distance from the other secondary system to the first reference point, and a distance from the other secondary system to the second reference point.

The first reference point and the second reference point may be located within coverage of a same primary system or different primary systems, which is described below in detail.

According to an embodiment of the present disclosure, the first reference point and the second reference point may be located within coverage of a same primary system. In this case, the primary system includes a primary system where the first reference point and the second reference point are located, i.e., one primary system. The distribution coefficient between the other secondary system and the first secondary system represents an interference degree of aggregation interference generated by the other secondary system and the first secondary system against the primary system where the first reference point and the second reference point are located.

Figure 4:
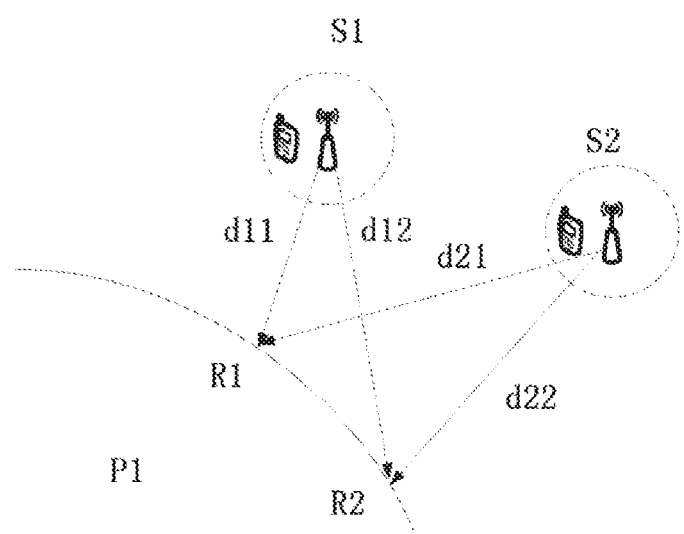
FIG. 4 is a schematic diagram showing a process of determining a distribution coefficient between two secondary systems according to an embodiment of the present disclosure.

FIG. 4 is a schematic diagram showing a process of determining a distribution coefficient between two secondary systems according to an embodiment of the present disclosure. As shown in FIG. 4, a reference point R1 corresponding to a secondary system S1 and a reference point R2 corresponding to a secondary system S2 are located within coverage of a primary system P1. In this case, a distribution coefficient between the secondary system S1 and the secondary system S2 represents an interference degree of aggregation interference generated by the secondary systems S1 and S2 against the primary system P1. The secondary system S1 may be regarded as the first secondary system, the secondary system S2 may be regarded as the other secondary system, the reference point R1 may be regarded as the first reference point, and the reference point R2 may be regarded as the second reference point. The process of determining the distribution coefficient in this case is described in detail hereinafter.

According to an embodiment of the present disclosure, the determining unit 211 in the processing circuit 210 may determine a first interference degree and a second interference degree respectively based on the first reference point and the second reference point, and determine a distribution coefficient based on the first interference degree and the second interference degree. That is, the distribution coefficient between the secondary systems S1 and S2 may be determined according to the interference degree determined based on the reference point R1 and the interference degree determined based on the reference point R2.

According to an embodiment of the present disclosure, the determining unit 211 in the processing circuit 210 may determine a first interference degree based on a distance from the first secondary system to the first reference point and a distance from the other secondary system to the first reference point, and may determine a second interference degree based on a distance from the first secondary system to the second reference point and a distance from the other secondary system to the second reference point. A location in the secondary system, such as a center of the secondary system or a location of a base station for the secondary system, may be designated to indicate the secondary system, so as to calculate the distance from the secondary system to the reference point.

In the examples of the present disclosure, for simplicity of calculation, the distribution coefficient is determined only based on the distance from the secondary system to the reference point. Those skilled in the art should appreciate that other parameters such as transmitter characteristics including antenna beam parameters, an antenna height, and a transmission model, may affect the distribution coefficient.

As shown in FIG. 4, a distance from the secondary system S1 to the reference point R1 is indicated by d11, a distance from the secondary system S1 to the reference point R2 is indicated by d12, a distance from the secondary system S2 to the reference point R1 is indicated by d21, and a distance from the secondary system S2 to the reference point R2 is indicated by d22. Thus, a first interference degree G1 may be calculated as follows:

$$G1 = \frac{1}{d11^\alpha} + \frac{1}{d21^\alpha} \tag{1}$$

where $\alpha$ denotes a fading index of a transmission path, which may be determined from experience values or tests. Similarly, a second interference degree G2 may be calculated as follows:

$$G2 = \frac{1}{d12^\alpha} + \frac{1}{d22^\alpha} \tag{2}$$

The determining unit 211 in the processing circuit 210 may determine a distribution coefficient C12 between the secondary systems S1 and S2 based on the first interference degree G1 and the second interference degree G2. For example, the determining unit 211 may determine a weighted sum of the first interference degree G1 and the second interference degree G2 as the distribution coefficient C12. As a simple example, the distribution coefficient C12 may be a sum of the first interference degree G1 and the second interference degree G2 namely:

$$C12 = G1 + G2 = \frac{1}{d11^\alpha} + \frac{1}{d21^\alpha} + \frac{1}{d12^\alpha} + \frac{1}{d22^\alpha} \tag{3}$$

The process of determining a distribution coefficient between two secondary systems in a case that the first reference point is different from the second reference point is described above in detail. In addition, the first reference point may be the same as the second reference point. In this case, the determining unit 211 in the processing circuit 210 may determine the distribution coefficient based on the distance from the first secondary system to the first reference point (the second reference point) and the distance from the other secondary system to the first reference point (the second reference point). That is, in the above example, only one of the G1 and the G2 is calculated as the distribution coefficient C12.

According to an embodiment of the present disclosure, the first reference point and the second reference point may be located within coverage of different primary systems. In this case, the primary system includes a primary system where the first reference point is located and a primary system where the second reference point is located, i.e., two primary systems. The distribution coefficient between the other secondary system and the first secondary system represents an interference degree of aggregation interference generated by the other secondary system and the first secondary system against the primary system where the first reference point is located and an interference degree of aggregation interference generated by the other secondary system and the first secondary system against the primary system where the second reference point is located.

Figure 5:
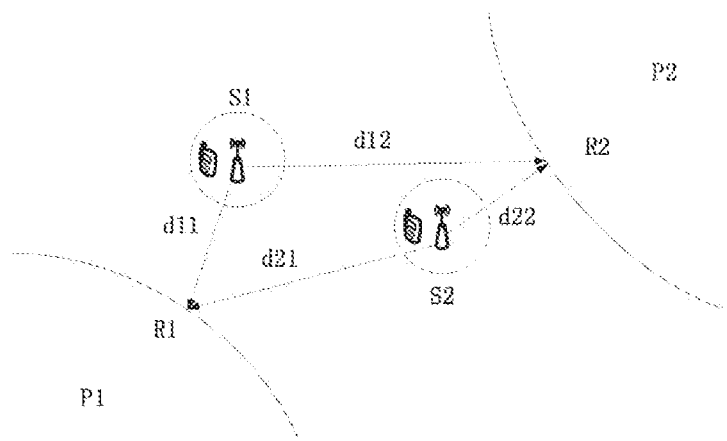
FIG. 5 is a schematic diagram showing a process of determining a distribution coefficient between two secondary systems according to another embodiment of the present disclosure.

FIG. 5 is a schematic diagram showing a process of determining a distribution coefficient between two secondary systems according to another embodiment of the present disclosure. As shown in FIG. 5, a reference point R1 corresponding to a secondary system S1 is located within coverage of a primary system P1, and a reference point R2 corresponding to a secondary system S2 is located within coverage of a primary system P2. In this case, a distribution coefficient between the secondary system S1 and the secondary system S2 represents an interference degree of aggregation interference generated by the secondary systems S1 and S2 against the primary system P1 and an interference degree of aggregation interference generated by the secondary systems S1 and S2 against the primary system P2. The secondary system S1 may be regarded as the first secondary system, the secondary system S2 may be regarded as the other secondary system, the reference point R1 may be regarded as the first reference point, and the reference point R2 may be regarded as the second reference point. The process of determining the distribution coefficient in this case is described in detail hereinafter.

According to an embodiment of the present disclosure, the determining unit 211 in the processing circuit 210 may determine, based on a distance from the first secondary system to the first reference point and a distance from the other secondary system to the first reference point, an interference degree of aggregation interference generated by the other secondary system and the first secondary system against the primary system where the first reference point is located, and determine, based on a distance from the first secondary system to the second reference point and a distance from the other secondary system to the second reference point, an interference degree of aggregation interference generated by the other secondary system and the first secondary system against the primary system where the second reference point is located. That is, the distribution coefficient between the secondary systems S1 and S2 may be determined according to the interference degree of the aggregation interference against the primary system P1 that is determined based on the reference point R1 and the interference degree of the aggregation interference against the primary system P2 that is determined based on the reference point R2.

As shown in FIG. 5, a distance from the secondary system S1 to the reference point R1 is indicated by d11, a distance from the secondary system S1 to the reference point R2 is indicated by d12, a distance from the secondary system S2 to the reference point R1 is indicated by d21, and a distance from the secondary system S2 to the reference point R2 is indicated by d22. According to an embodiment of the present disclosure, the G1 may be calculated from the above formula (1), and the G2 may be calculated from the above formula (2), where the G1 represents the interference degree of the aggregation interference generated by the secondary systems S1 and S2 against the primary system P1, and the G2 represents the interference degree of the aggregation interference generated by the secondary systems S1 against the primary system P2. The determining unit 211 may calculate a distribution coefficient C12 between the secondary systems S1 and S2 from the above formula (3). That is, the distribution coefficient between the other secondary system and the first secondary system may be a weighted sum of the interference degree of the generated aggregation interference against the primary system where the first reference point is located and the interference degree of the generated aggregation interference against the primary system where the second reference point is located. More simply, the distribution coefficient between the other secondary system and the first secondary system may be a sum of the interference degree of the generated aggregation interference against the primary system where the first reference point is located and the interference degree of the generated aggregation interference generated against the primary system where the second reference point is located.

It can be seen that, no matter whether the first reference point and the second reference point are located within coverage of a same primary system, the distribution coefficient may include two parts, one of which is an interference degree determined based on distances from the first secondary system and the other secondary system to the first reference point, and the other of which is an interference degree determined based on distances from the first secondary system and the other secondary system to the second reference point. In the case that the first reference point and the second reference point are located within coverage of a same primary system, each of the two parts represents the interference degree of the aggregation interference generated by the other secondary system and the first secondary system against the primary system where the first reference point and the second reference point are located. In addition, in the case that the first reference point and the second reference point are located within coverage of different primary systems, the two parts respectively represent an interference degree of generated aggregation interference against a primary system where the first reference point is located and an interference degree of generated aggregation interference against a primary system where the second reference point is located.

As described above, the determining unit 211 may determine the distribution coefficient between the other secondary system and the first secondary system. The distribution coefficient represents an interference degree of aggregation interference generated by the other secondary system and the first secondary system against the primary system where the reference point is located. In a case that there are multiple primary systems where the reference point is located, the distribution coefficient represents interference degrees of generated aggregation interference against the multiple primary systems. In this way, by taking the interference generated by the secondary systems against the primary system into consideration during the distribution of frequency spectrum resources, the aggregation interference generated at the primary system can be reduced.

In addition, the above calculation method is merely exemplary, and the distribution coefficient may be calculated according to distances from the secondary systems to the reference point by using other methods. Further, the distribution coefficients may also be determined according to other parameters such as transmitter characteristics including antenna beam parameters, an antenna height, and a transmission model.

According to an embodiment of the present disclosure, a reference point corresponding to a secondary system may be determined by a geographic location database in a region where the secondary system is located. That is, a geographic location database in each region may determine a reference point corresponding to a secondary system within coverage of the region.

According to an embodiment of the present disclosure, the transceiving unit 220 may receive the first reference point information from a geographic location database in a region where the frequency spectrum management device 200 is located. Since the first secondary system is located within coverage of the frequency spectrum management device 200, the first reference point may be determined by the geographic location database in the region.

According to an embodiment of the present disclosure, the other secondary system may be located outside the coverage of the frequency spectrum management device 200 or within the coverage of the frequency spectrum management device 200. The process of determining the other secondary system is described in detail hereinafter.

According to an embodiment of the present disclosure, the processing circuit 210 may determine the other secondary system according to geographic location information. The other secondary system may include one or more other secondary systems, and the determining unit 211 in the processing circuit 210 may determine a distribution coefficient between each of the one or more other secondary systems and the first secondary system. That is, the distribution unit 212 may distribute a frequency spectrum resource for the first secondary system according to distribution coefficients between each of the secondary systems and the first secondary system. Further, each of the secondary systems corresponds to one reference point. In the case that the other secondary system includes multiple secondary systems, there are multiple second reference points.

According to an embodiment of the present disclosure, the other secondary system includes one or more secondary systems which cause interference to the primary system in a region where the frequency spectrum management device 200 is located and which are managed by an other frequency spectrum management device except the frequency spectrum management device 200. That is, the other secondary system and the first secondary system are located in different regions. In other words, the other secondary system and the first secondary system are managed by different frequency spectrum management devices.

Figure 6:
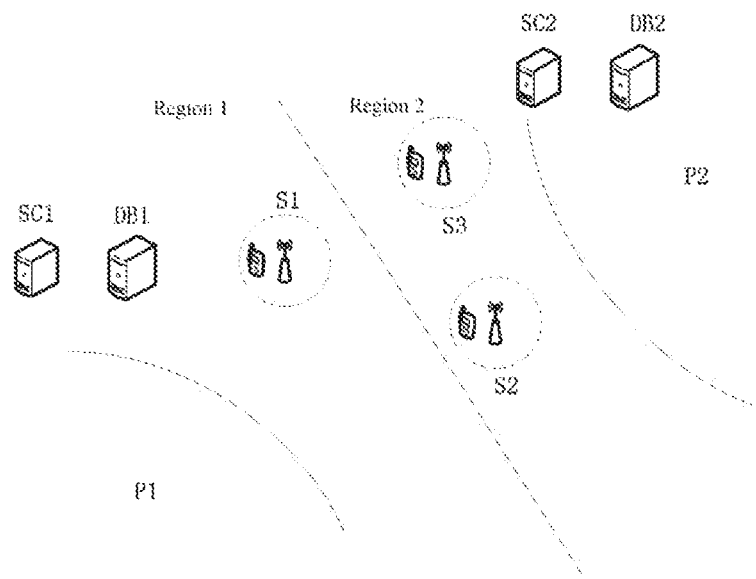
FIG. 6 is a schematic diagram showing a process of determining an other secondary system according to an embodiment of the present disclosure.

FIG. 6 is a schematic diagram showing a process of determining an other secondary system according to an embodiment of the present disclosure. As shown in FIG. 6, a secondary system S1 is located in a region 1, there are a primary system P1, a frequency spectrum management device SC1, and a geographic location database DB1 in the region 1, and the secondary system S1 is managed by the frequency spectrum management device SC1. Secondary systems S2 and S3 are located in a region 2, there are a primary system P2, a frequency spectrum management device SC2, and a geographic location database DB2 in the region 2, and the secondary systems S2 and S3 are managed by the frequency spectrum management device SC2. The secondary system S1 may be regarded as the first secondary system. Since the secondary systems S2 and S3 are close to the primary system P1, the secondary systems S2 and S3 may cause interference to the primary system P1. In this case, the processing circuit 210 may determine the secondary systems S2 and S3 as the other secondary system.

It should be noted that, FIG. 6 only shows the case that the other secondary system include two secondary systems. Practically, the other secondary system may include one secondary system or more than two secondary systems.

According to an embodiment of the present disclosure, a reference point corresponding to the secondary system S2 and a reference point corresponding to the secondary system S3 (that is, the second reference points) may be determined by the geographic location database DB2, and the SC2 may acquire the second reference point information by accessing the database DB2. According to an embodiment of the present disclosure, the transceiving unit 220 may receive the second reference point information from the other frequency spectrum management device except the frequency spectrum management device 200. That is, information may be exchanged between frequency spectrum management devices in different regions, including locations of secondary systems managed by the frequency spectrum management devices, frequency spectrum resources, and reference point information.

That is, according to an embodiment of the present disclosure, in a case that the other secondary system and the first secondary system are located in different regions, the transceiving unit 220 may receive the second reference point information from the frequency spectrum management device managing the other secondary system. The determining unit 211 may determine the distribution coefficient between each of the other secondary systems and the first secondary system based on the first reference point information received from the DB1 and the second reference point information received from the SC2 in the manner described above. The distribution unit 212 may distribute the frequency spectrum resource for the first secondary system according to the distribution coefficients between each of the other secondary systems and the first secondary system.

According to an embodiment of the present disclosure, the other secondary system may include only secondary systems in different regions from the first secondary system. In this case, the distribution unit 212 may distribute the frequency spectrum resource for the first secondary system by only taking distribution coefficients between the first secondary system and the secondary systems in different regions from the first secondary system into consideration, to avoid the case as much as possible that the same frequency spectrum resource is distributed for secondary systems having large distribution coefficients. Therefore, the frequency spectrum resources distributed for secondary systems at a junction of different regions should be as different as possible, thereby reducing signaling interaction between the frequency spectrum management devices in different regions.

According to an embodiment of the present disclosure, the other secondary system may further include one or more secondary systems managed by the frequency spectrum management device 200. That is, the other secondary system and the first secondary system are located in a same region. In other words, the other secondary system and the first secondary system are managed by a same frequency spectrum management device.

Figure 7:
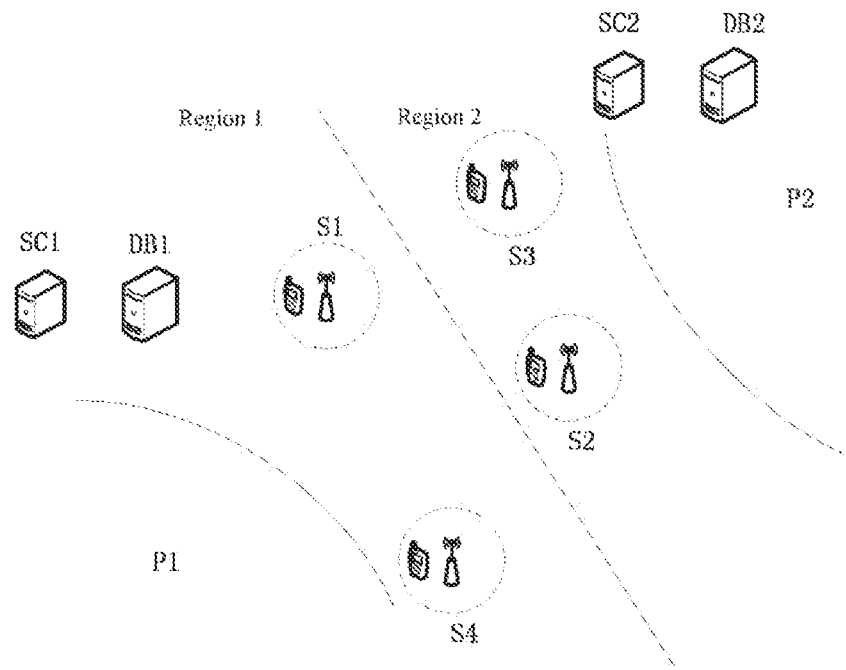
FIG. 7 is schematic diagram showing a process of determining an other secondary system according to another embodiment of the present disclosure.

FIG. 7 is schematic diagram showing a process of determining an other secondary system according to another embodiment of the present disclosure. As shown in FIG. 7, secondary system S1 and S4 are located in a region 1, there are a primary system P1, a frequency spectrum management device SC1, and a geographic location database DB1 in the region 1, and the secondary system S1 and S4 are managed by the frequency spectrum management device SC1. In this case, the processing circuit 210 may determine only the secondary system S4 as the other secondary system, and may also determine the secondary systems S2, S3, and S4 as the other secondary system.

It should be noted that, FIG. 7 only shows the case that the other secondary system located in the same region as the first secondary system include one secondary system. Practically, the other secondary system located in the same region as the first secondary system may also include multiple secondary systems.

According to an embodiment of the present disclosure, a reference point (the second reference point) corresponding to the secondary system S4 may be determined by the DB1. Thus, the transceiving unit 220 may receive the second reference point information from a geographic location database in a region where the frequency spectrum management device 200 is located.

That is, according to an embodiment of the present disclosure, in a case that the other secondary system and the first secondary system are located in different regions, the transceiving unit 220 may receive the second reference point information from the frequency spectrum management device managing the other secondary system. In addition, in a case that the other secondary system and the first secondary system are located in a same region, the transceiving unit 220 may receive the second reference point information from the geographic location database in the region. The determining unit 211 may then determine the distribution coefficient between each of the other secondary systems and the first secondary system based on the first reference point information received from the DB1 and the second reference point information received from the DB1 and/or the SC2. The distribution unit 212 may distribute the frequency spectrum resource for the first secondary system according to distribution coefficients between the other secondary systems and the first secondary system.

As described above, the determining unit 211 may determine the distribution coefficient between the other secondary system and the first secondary system no matter whether the other secondary system and the first secondary system are located in a same region. According to another embodiment of the present disclosure, in a case that the other secondary system and the first secondary system are located in different regions, the transceiving unit 220 may receive the distribution coefficient between the other secondary system and the first secondary system from the frequency spectrum management device where the other secondary system is located. That is, in the case that the first secondary system and the other secondary system are located in different regions, the distribution coefficient between the other secondary system and the first secondary system may be determined by the frequency spectrum management device in the region where the first secondary system is located, or by the frequency spectrum management device in the region where the other secondary system is located.

According to an embodiment of the present disclosure, the transceiving unit 220 may transmit location information of the first secondary system, or both the location information of the first secondary system and the first reference point information, to the frequency spectrum management device in the region where the other secondary system is located, so that the frequency spectrum management device in the region where the other secondary system is located may determine the distribution coefficient. For example, in the embodiment shown in FIG. 7, the SC1 may transmit location information of the secondary system S1, or both the location information of the secondary system S1 and the first reference point information, to the SC2, and may receive a distribution coefficient between the secondary system S3 and S1, and a distribution coefficient between the secondary systems S2 and S1 from the SC2.

According to an embodiment of the present disclosure, the determining unit 211 may determine only a distribution coefficient between the other secondary system managed by the frequency spectrum management device 200 and the first secondary system, and the transceiving unit 220 may receive a distribution coefficient between an other secondary system managed by the other frequency spectrum management device and the first secondary system. In this case, the distribution unit 212 may distribute the frequency spectrum resource for the first secondary system according to the distribution coefficient determined by the determining unit 211 and the distribution coefficient received by the transceiving unit 220.

According to an embodiment of the present disclosure, the other secondary system may include only secondary systems in the same region as the first secondary system. In this case, the distribution unit 212 may distribute the frequency spectrum resource for the first secondary system by only taking distribution coefficients between the first secondary system and the secondary systems in the same region as the first secondary system into consideration, to avoid the case as much as possible that the same frequency spectrum resource is distributed for secondary systems having large distribution coefficients, thereby reducing aggregation interference against the primary system.

According to an embodiment of the present disclosure, the other secondary system may include not only secondary systems located in the same region as the first secondary system, but also secondary systems located in different regions from the first secondary system. In this case, the distribution unit 212 may distribute the frequency spectrum resource for the first secondary system by taking distribution coefficients between the first secondary system and all the other secondary systems into consideration, thereby reducing aggregation interference against the primary system, and reducing signaling interaction between the frequency spectrum management devices in different regions.

As described above, the determining unit 211 may determine the distribution coefficient between the other secondary system and the first secondary system. Next, a process that the distribution unit 212 distributes the resource for the first secondary system according to the distribution coefficient determined by the determining unit 211 is described below in detail.

According to an embodiment of the present disclosure, the distribution unit 212 in the processing circuit 210 may be configured to distribute, for the first secondary system and the other secondary system, frequency spectrum resources that are orthogonal in frequency in a case that the distribution coefficient between the other secondary system and the first secondary system is greater than a specified threshold. Further, the distribution unit 212 may further be configured to distribute a same frequency spectrum resource for the first secondary system and the other secondary system in a case that the distribution coefficient between the other secondary system and the first secondary system is less than a specified threshold.

That is, the distribution unit 212 distributes the frequency spectrum resource for the secondary system according to a principle of avoiding the case as much as possible that the same frequency spectrum resource is distributed for two secondary systems having large distribution coefficients. This is because that a large distribution coefficient indicates a large interference degree of aggregation interference generated by the two secondary systems against a primary system. In this case, by distributing different frequency spectrum resources for the two secondary systems, the generated aggregation interference against the primary system can be effectively reduced.

According to an embodiment of the present disclosure, the distribution unit 212 may achieve the above object by various methods. For example, the distribution unit 212 may establish an undirected weighted graph including the first secondary system and all other secondary systems, where a weight of an edge in the undirected weighted graph is based on a distribution coefficient between two secondary systems represented by two vertices of the edge.

Figure 8:
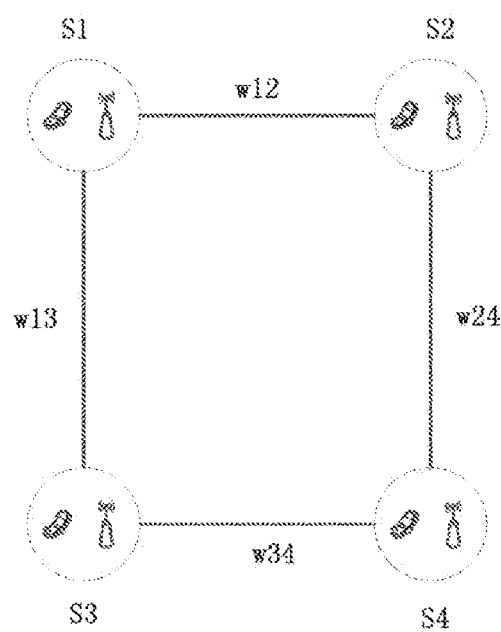
FIG. 8 is a schematic diagram showing an undirected weighted graph according to an embodiment of the present disclosure.

FIG. 8 is a schematic diagram showing an undirected weighted graph according to an embodiment of the present disclosure. The undirected weighted graph shown in FIG. 8 is determined based on the example shown in FIG. 6, in which the other secondary system includes only secondary systems located in different regions from the first secondary system. As shown in FIG. 8, vertices in the undirected weighted graph represent secondary systems, an edge between two vertices indicate that there is a distribution coefficient between two secondary systems represented by the two vertices connected with the edge, and a weight of the edge is based on a distribution coefficient between the two secondary systems represented by the two vertices connected with the edge. In FIG. 8, w12 represents a weight of an edge between secondary systems S1 and S2, and is based on a distribution coefficient C12 between the secondary systems S1 and S2. Similarly, w13 is based on a distribution coefficient C13 between secondary systems S1 and S3, w34 is based on a distribution coefficient C34 between secondary systems S4 and S3, and w24 is based on a distribution coefficient C24 between the secondary systems S2 and S4.

According to an embodiment of the present disclosure, after the determining unit 211 determines the distribution coefficients C12, C13, C34 and C24, the distribution unit 212 may determine the weights w12, w13, w34, and w24, and determine the undirected weighted graph shown in FIG. 8. Next, the distribution unit 212 may distribute the frequency spectrum resource for the first secondary system according to the established undirected weighted graph. Since the first secondary system may be any one of secondary systems managed by the frequency spectrum management device 200, the distribution unit 212 may distribute, according to the undirected weighted graph, frequency spectrum resources for the other secondary systems such as the secondary system S4 managed by the frequency spectrum management device 200.

Figure 9:
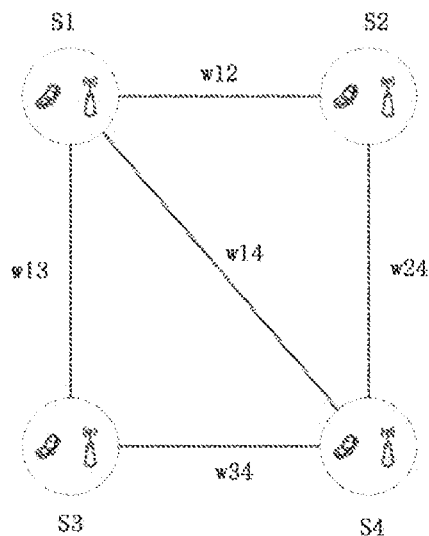
FIG. 9 is a schematic diagram showing an undirected weighted graph according to another embodiment of the present disclosure.

FIG. 9 is a schematic diagram showing an undirected weighted graph according to another embodiment of the present disclosure. The undirected weighted graph shown in FIG. 9 is determined based on the example shown in FIG. 7, in which the other secondary system includes not only secondary systems located in different regions from the first secondary system, but also secondary systems located in the same region as the first secondary system. Similarly, in FIG. 9, vertices in the undirected weighted graph represent secondary systems, an edge between two vertices indicate that there is a distribution coefficient between two secondary systems represented by the two vertices connected with the edge, and a weight of the edge is based on a distribution coefficient between the two secondary systems represented by the two vertices connected with the edge.

According to an embodiment of the present disclosure, the weight may be determined according to the distribution coefficient in various manners. The weight is generally proportional to the corresponding distribution coefficient. That is, the interference degree of aggregation interference generated by the other secondary system and the first secondary system against the primary system is larger, the weight of the edge connecting the other secondary system and the first secondary system in the undirected weighted graph is larger. In an embodiment, a weight of an edge in the undirected weighted graph is equal to a distribution coefficient between two secondary systems represented by two vertices of the edge.

According to an embodiment of the present disclosure, the distribution unit in the processing circuit 210 may be configured to: distribute, for the first secondary system and the other secondary system, frequency spectrum resources that are orthogonal in frequency in a case that the weight of the edge between the vertices representing the first secondary system and the other secondary system in the undirected weighted graph is greater than a specified threshold; or distribute a same frequency spectrum resource for the first secondary system and the other secondary system in a case that the weight of the edge between the vertices representing the first secondary system and the other secondary system in the undirected weighted graph is less than the specified threshold.

For example, in the example shown in FIG. 7, the secondary systems S1 and S4 are far away from each other, but both are close to the primary system P1. In this case, the distribution coefficient C14 between the secondary systems S1 and S4 may be large, which results in a large weight w14 in the undirected weighted graph in FIG. 9. It is assumed that w14>w12>w13 or w14>w13>w12, the distribution unit 212 may distribute, for the secondary systems S1 and S4, frequency spectrum resources that are orthogonal in frequency.

According to an embodiment of the present disclosure, in the undirected weighted graph shown in FIG. 9, the weight of the edge in the undirected weighted graph may also be based on whether the two secondary systems represented by the two vertices of the edge are managed by a same frequency spectrum management device.

A parameter $A_{ij}$ between secondary systems may be defined to indicate whether secondary systems $S_i$ and $S_j$ are managed by a same frequency spectrum management device. For example, the parameter $A_{ij}$ may be set to be equal to $A_1$ in a case that the secondary systems $S_i$ and $S_j$ are managed by different frequency spectrum management devices, and may be set to be equal to $A_2$ in a case that the secondary systems $S_i$ and $S_j$ are managed by a same frequency spectrum management device.

Further, the distribution unit 212 may determine a weight $w_{ij}$ of an edge connecting the secondary systems $S_i$ and $S_j$ in the undirected weighted graph according to the parameter Aij and a distribution coefficient Cij between the secondary systems Si and Sj. As a non-limiting example, the weight is expressed as wij=Aij×Cij.

As mentioned above, the other secondary system may include secondary systems located in different regions from the first secondary system, so that the frequency spectrum resources for the secondary systems in different regions are as different as possible, thereby reducing the signaling interaction between the frequency spectrum management devices in different regions. Further, the other secondary system may also include secondary systems in the same region as the first secondary system, thereby reducing the aggregation interference against the primary system.

According to an embodiment of the present disclosure, values of A1 and A2 may be set according to system performance requirements. For example, in a case that a requirement for reducing the aggregation interference against the primary system is larger than a requirement for reducing the signaling interaction between the frequency spectrum management devices in different regions, it may be set that A1<A2. In addition, in a case that the requirement for reducing the aggregation interference against the primary system is smaller than the requirement for reducing the signaling interaction between the frequency spectrum management devices in different regions, it may be set that A1>A2. In the latter case, if A1 is much greater than A2, the effect thereof is similar to that of the undirected weighted graph shown in FIG. 8. That is, although the distribution coefficient between the other secondary system located in the same region as the first secondary system and the first secondary system is calculated, the distribution coefficient does not play a decisive role in the distribution of frequency spectrum resources.

As described above, the distribution unit 212 may distribute the frequency spectrum resource for the first secondary system according to the distribution coefficient between the other secondary system and the first secondary system. According to an embodiment of the present disclosure, the transceiving unit 220 may further transmit the distributed frequency spectrum resource to the first secondary system, so that the first secondary system can use the distributed frequency spectrum resource for communication.

The frequency spectrum management device 200 is described above. According to an embodiment of the present disclosure, the frequency spectrum management device 200 distributes the frequency spectrum resource by taking a distribution coefficient between two secondary systems into consideration, where the distribution coefficient represents an interference degree of aggregation interference generated by the two secondary systems against the primary system. That is, the frequency spectrum management device 200 may distribute frequency spectrum resources for the secondary systems such that the aggregation interference generated by the secondary systems against the primary system is as small as possible, and the signaling interaction between the frequency spectrum management device 200 and the other frequency spectrum management device is as small as possible, thereby saving signaling overhead and improving the frequency spectrum utilization efficiency.

3. Second Embodiment

Figure 10:
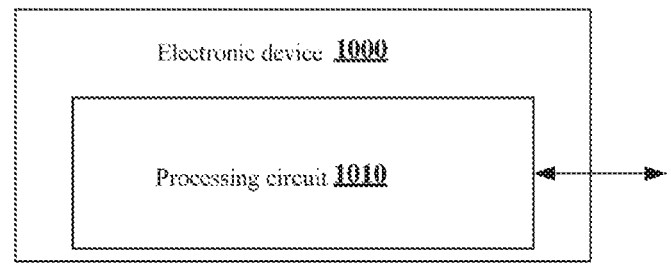
FIG. 10 is a block diagram showing a configuration example of an electronic device according to an embodiment of the present disclosure.

In this embodiment, an electronic device 1000 according to an embodiment of the present disclosure is described in detail. The electronic device 1000 may include a geographic location database DB. FIG. 10 is a block diagram showing a configuration example of the electronic device 1000 according to the embodiment of the present disclosure.

As shown in FIG. 10, the electronic device 1000 may include a processing circuit 1010. It should be noted that the electronic device 1000 may include one processing circuit 1010 or multiple processing circuits 1010.

Although functional units of the processing circuit 1010 are not illustrated herein, the processing circuit 1010 may include various discrete functional units to perform various different functions and/or operations. It should be noted that the functional units may be physical entities or logical entities, and units referred to as different names may be implemented by a same physical entity.

According to an embodiment of the present disclosure, the processing circuit 1010 may receive location information from a secondary system in a region where the electronic device 1000 is located. The electronic device 1000 may receive the location information from any one secondary system in the region where the electronic device is located. The location information may be received periodically or in response to an event. For example, the secondary system in the region where the electronic device 1000 is located may report the location information to the electronic device 1000 periodically, or report the location information to the electronic device 1000 when the secondary system accesses a primary system (for example, in a case that the secondary system is a wifi system, the secondary system reports the location information in response to a power-on operation).

According to an embodiment of the present disclosure, the processing circuit 1010 may determine reference point information corresponding to the secondary system according to the location information of the secondary system. Each secondary system has a corresponding reference point. The reference point corresponding to the secondary system may be the most severely interfered point within coverage of one or more primary systems that are interfered by the secondary system. For example, the processing circuit 1010 may acquire the location information of the secondary system via the transceiving unit, and determine the reference point corresponding to the secondary system according to the location information of the secondary system.

According to an embodiment of the present disclosure, the processing circuit 1010 may further transmit information on the reference point corresponding to the secondary system to a frequency spectrum management device in the region where the electronic device 1000 is located. The frequency spectrum management device herein may be the frequency spectrum management device 200 described in the first embodiment. That is, the frequency spectrum management device may determine distances from the secondary system and an other secondary system to the primary system by using the information on the reference point, and determine a distribution coefficient between the secondary system and the other secondary system. The distribution coefficient represents an interference degree of aggregation interference generated by the other secondary system and the secondary system against the primary system. The frequency spectrum management device may distribute a frequency spectrum resource for the secondary system according to the distribution coefficient. This part has been described in detail in the first embodiment and is not repeated herein.

According to an embodiment of the present disclosure, the reference point corresponding to the secondary system may be a point closest to the secondary system within coverage of one or more primary systems that are interfered by the secondary system. That is, in a case that a secondary system causes interference to one primary system, a position closest to the secondary system within coverage of the primary system is determined as the reference point corresponding to the secondary system. In a case that a secondary system causes interference to multiple primary systems, a position closest to the secondary system within coverage of the multiple primary systems is determined to be the reference point corresponding to the secondary system. Therefore, the reference point is located at the edge of the primary system.

According to an embodiment of the present disclosure, the reference point corresponding to the secondary system may be an edge position of one or more primary systems that are interfered by the secondary system, with the minimum amount of interference that can further be tolerated. That is, in a case that a secondary system causes interference to one primary system, an edge position of the primary system having the minimum amount of tolerable interference is determined as the reference point corresponding to the secondary system. In a case that a secondary system causes interference to multiple primary systems, an edge position of the multiple primary systems with the minimum amount of interference that can further be tolerated is determined as the reference point corresponding to the secondary system.

The amount of interference that can further be tolerated by an edge position indicates a difference between the total amount of interference that the edge position can tolerate and the amount of interference that has been subjected. For example, the total amount of interference that can be tolerated by an edge position of a primary system is 10 dB, the edge position has been subjected to the interference of 6 dB, and thus the edge position can further tolerate the interference of 4 dB. That is, the small amount of interference that can be tolerated by an edge position indicates the severe interference subjected by the edge position.

Figure 11:
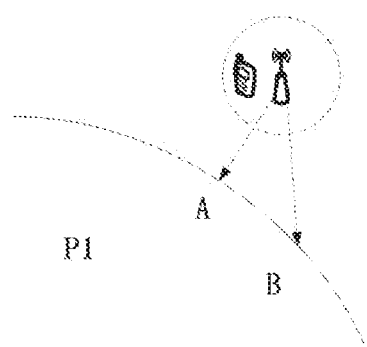
FIG. 11 is a schematic diagram showing a process of determining a reference point according to an embodiment of the present disclosure.

The process of determining a reference point is described in detail below with reference to FIG. 11. FIG. 11 is a schematic diagram showing a process of determining a reference point according to an embodiment of the present disclosure.

As shown in FIG. 11, a secondary system is located outside coverage of a primary system P1. In FIG. 11, it is assumed that the secondary system causes interference to only one primary system, i.e., the primary system P1. According to an embodiment of the present disclosure, a position closest to the secondary system within coverage of the primary system P1 is determined as a reference point corresponding to the secondary system. As shown in FIG. 11, a point A may be determined as the reference point corresponding to the secondary system. According to an embodiment of the present disclosure, an edge position of the primary system P1 with the minimum amount of interference that can further be tolerated is determined as the reference point. For example, it is assumed that the amount of interference that can further be tolerated by an edge position A is 5 dB, and the amount of interference that can further be tolerated by an edge position B is 3 dB. Although the secondary system is closer to the edge position A than the edge position B, the edge position B may be determined as the reference point corresponding to the secondary system.

As described above, the electronic device 1000 may determine the reference point corresponding to the secondary system according to the location information of the secondary system, and transmit the information on the reference point to the frequency spectrum management device 200. The frequency spectrum management device 200 may calculate the distribution coefficient between the secondary systems, thereby reducing the aggregation interference against the primary system, and reducing the signaling interaction between different frequency spectrum management devices.

According to an embodiment of the present disclosure, the electronic device 1000 may include a geographic location database DB and may interact with the frequency spectrum management device 200. Therefore, all embodiments of the frequency spectrum management device 200 in the first embodiment are applicable in this embodiment.

4. Third Embodiment

In this embodiment, an electronic device 1200 for a secondary system according to an embodiment of the present disclosure is described in detail. The electronic device 1200 may be a base station device in the secondary system. In a case that there is no base station device in the secondary system, and some terminal devices in the secondary system may have functions of the base station device, the electronic device 1200 may also be a terminal device in the secondary system.

Figure 12:
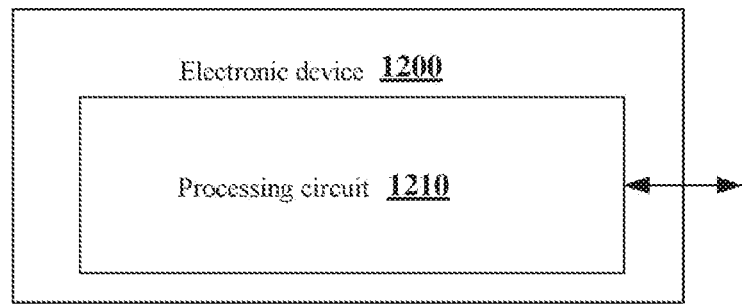
FIG. 12 is a block diagram showing a configuration example of an electronic device for a secondary system according to an embodiment of the present disclosure.

FIG. 12 is a block diagram showing a configuration example of an electronic device 1200 according to an embodiment of the present disclosure.

As shown in FIG. 12, the electronic device 1200 may include a processing circuit 1210. It should be noted that the electronic device 1200 may include one processing circuit 1210 or multiple processing circuits 1210.

Although functional units of the processing circuit 1210 are not illustrated herein, the processing circuit 1210 may include various discrete functional units to perform various different functions and/or operations. It should be noted that the functional units may be physical entities or logical entities, and units referred to as different names may be implemented by a same physical entity.

According to an embodiment of the present disclosure, the processing circuit 1210 may receive frequency spectrum resource information from a frequency spectrum management device managing the secondary system. The frequency spectrum management device herein may be, for example, the frequency spectrum management device 200 in the first embodiment. Therefore, the frequency spectrum resource may be distributed by the frequency spectrum management device 200 for the electronic device 1200 according to a distribution coefficient between an other secondary system and the secondary system where the electronic device 1200 is located. The distribution coefficient is determined according to distances from the other secondary system and the secondary system where the electronic device 1200 is located to a primary system, and the distribution coefficient represents an interference degree of aggregation interference generated by the other secondary system and the secondary system where the electronic device 1200 is located against the primary system.

According to an embodiment of the present disclosure, the processing circuit 1210 may obtain a frequency spectrum resource according to the acquired frequency spectrum resource information. The frequency spectrum resource information herein may include frequency information corresponding to the frequency spectrum resource that may be used by the secondary system. Next, the electronic device 1200 may perform communication by using the obtained frequency spectrum resource.

According to an embodiment of the present disclosure, the processing circuit 1210 may further transmit location information of the electronic device 1200 to a geographic location database in a region where the electronic device 1200 is located. The geographic location database may be included in, for example, the electronic device 1000 in the second embodiment. The geographic location database in the region where the electronic device 1200 is located may determine reference point information corresponding to the secondary system where the electronic device 1200 is located according to the location information of the electronic device 1200.

The location information may be received periodically or in response to an event. For example, the electronic device 1200 may report the location information to the geographic location database periodically, or report the location information to the geographic location database when the electronic device 1200 accesses a primary system (for example, in a case that the secondary system is a wifi system, the electronic device 1200 reports the location information in response to a power-on operation).

As described above, according to an embodiment of the present disclosure, the electronic device 1200 for the secondary system may receive the information on the frequency spectrum resource distributed according to the distribution coefficient between the secondary system and the other secondary system from the frequency spectrum management device. In this way, in a process that the electronic device 1200 performs communication using the information, the generated aggregation interference against the primary system can be reduced, and the signaling interaction between the frequency spectrum management devices can be reduced.

According to an embodiment of the present disclosure, the electronic device 1200 may transmit location information to a geographic location database DB (included in the electronic device 1000), and may receive frequency spectrum resource information from the frequency spectrum management device 200. Therefore, all embodiments of the frequency spectrum management device 200 in the first embodiment and the electronic device 1000 in the second embodiment are applicable in this embodiment.

Figure 13:
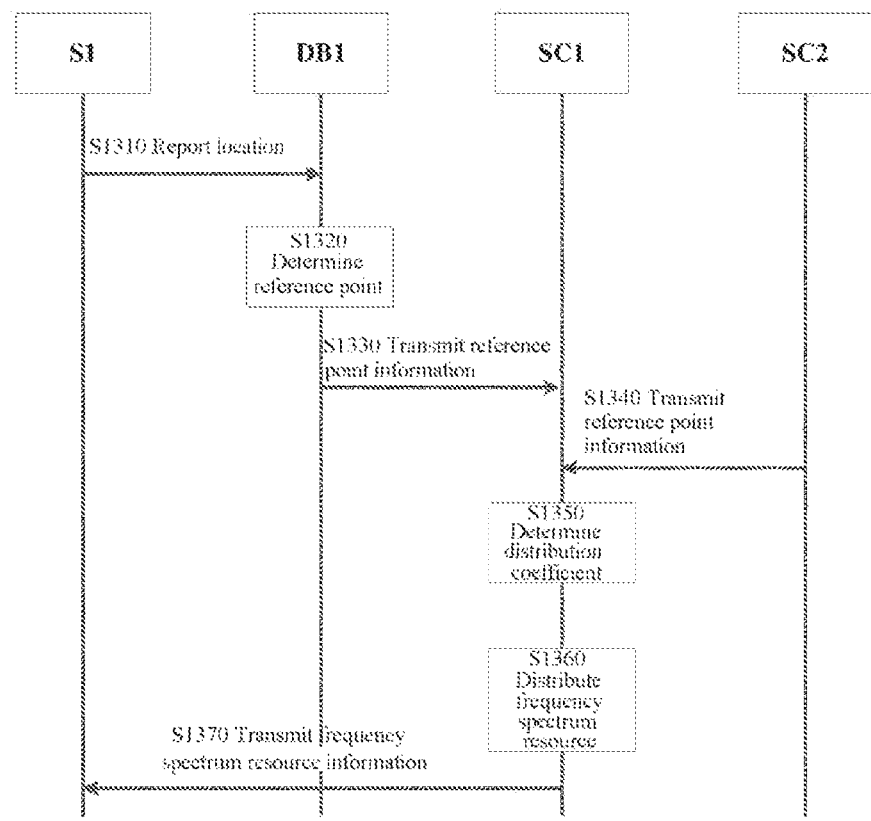
FIG. 13 is a signaling flowchart showing a process of distributing frequency spectrum resources according to an embodiment of the present disclosure.

FIG. 13 is a signaling flowchart showing a process of distributing frequency spectrum resources according to an embodiment of the present disclosure. In FIG. 13, S1 represents a secondary system, there are a geographic location database DB1 and a frequency spectrum management device SC1 in a region where the secondary system is located, and SC2 represents an other frequency spectrum management device different from the SC1. As shown in FIG. 13, in step S1310, the S1 reports location information to the DB1. Next, in step S1320, the DB1 determines a reference point corresponding to the secondary system S1 based on the location information reported by the S1. Further, the DB1 may also determine available frequency spectrum resources under a condition that the SC1 meets a requirement for protecting the primary system. Next, in step S1330, the DB1 transmits the reference point information of the secondary system S1 to the SC1. Optionally, the DB1 may further transmit the available frequency spectrum resources, and the SC1 may select a frequency spectrum resource for the secondary system from the available frequency spectrum resources. If the secondary system S1 is regarded as the first secondary system, and the other secondary system includes secondary systems located in the same region as the secondary system S1, the DB1 further transmits reference point information of the other secondary system to the SC1. In addition, if the other secondary system further includes secondary systems located in different regions from the secondary system S1, the SC2 transmits reference point information of the other secondary system, the location information of the secondary system, and frequency spectrum usage to the SC1 in step S1340. Next, in step S1350, the SC1 determines a distribution coefficient between the other secondary system and the secondary system S1 based on the reference point information transmitted from the DB1 and the SC2. Next, in step S1360, the SC1 distributes a frequency spectrum resource for the secondary system S1. Next, in step S1370, the SC1 transmits information on the distributed frequency spectrum resource to the secondary system S1. In this way, the SC1 can use the distributed frequency spectrum resource for communication.

Figure 14:
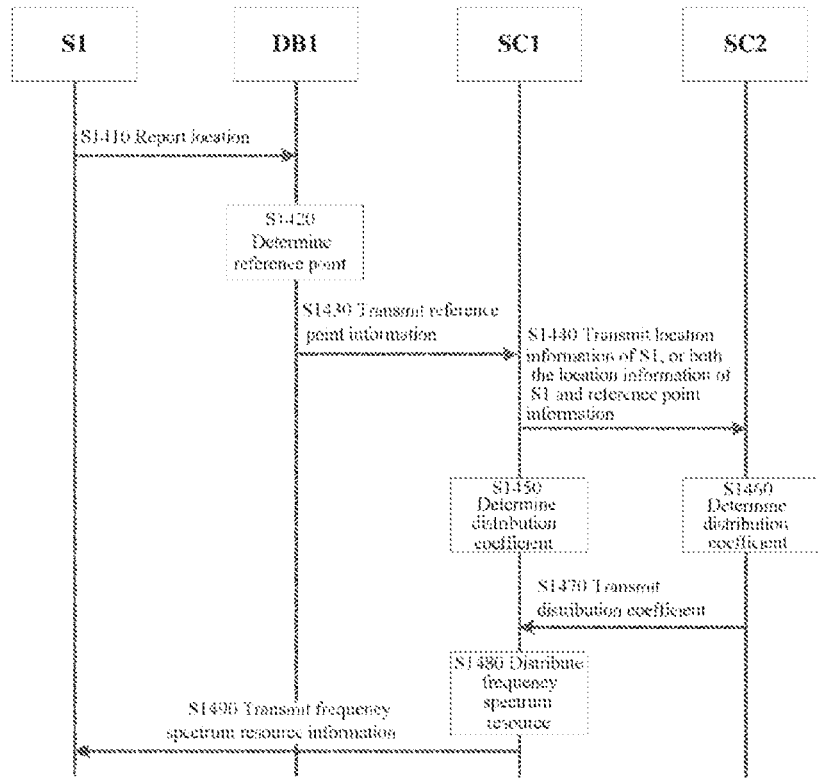
FIG. 14 is a signaling flowchart showing a process of distributing frequency spectrum resources according to another embodiment of the present disclosure.

FIG. 14 is a signaling flowchart showing a process of distributing frequency spectrum resources according to another embodiment of the present disclosure. Similarly, in FIG. 14, S1 represents a secondary system, there are a geographic location database DB1 and a frequency spectrum management device SC1 in a region where the secondary system is located, and SC2 represents an other frequency spectrum management device different from the SC1. In step S1410, the S1 reports location information to the DB1. Next, in step S1420, the DB1 determines a reference point corresponding to the secondary system S1 based on the location information reported by the S1. Further, the DB1 may also determine available frequency spectrum resources under a condition that the SC1 meets a requirement for protecting the primary system. In step S1430, the DB1 transmits the reference point information of the secondary system S1 and the available frequency spectrum resources to the SC1. The SC1 may select a frequency spectrum resource for the secondary system from the available frequency spectrum resources. If the secondary system S1 is regarded as the first secondary system, and the other secondary system includes secondary systems located in the same region as the secondary system S1, the DB1 further transmits reference point information of the other secondary system to the SC1. In addition, if the other secondary system further includes secondary systems located in different regions from the secondary system S1, the SC1 may transmit geographical location information of the first secondary system, or both the geographic location information and the reference point information of the secondary system to the SC2 in step S1440. In step S1450, the SC1 determines a distribution coefficients between the secondary system S1 and the other secondary system located within coverage of the same frequency spectrum management device as the secondary system S1. In step S1460, the SC2 may determine, according to secondary systems managed by the SC2 and information on the primary system owned by the SC2, a distribution coefficient between the first secondary system S1 and each of other secondary systems managed by the SC2. In step S1470, the SC2 transmits the distribution coefficient between the first secondary system and the other secondary system and the frequency spectrum usage (including channel and power) of the corresponding secondary system to the SC1. Next, in step S1480, the SC1 distributes a frequency spectrum resource for the secondary system S1 according to the distribution coefficient determined in step S1450 and the distribution coefficient received in step S1470. For example, if frequency bands that can be used by the first secondary system are bands 1 to 10, and the existing channel usage information and distribution coefficients of the other secondary systems are known, the SC1 may select an appropriate frequency band for the first secondary system from the bands 1 to 10 according to the distribution coefficients and the channel usage of the other secondary systems. Next, in step S1490, the SC1 transmits information on the distributed frequency spectrum resource to the secondary system S1. In this way, the SC1 can use the distributed frequency spectrum resource for communication.

The frequency spectrum management device 200, the electronic device 1000, and the electronic device 1200 according to the embodiments of the present disclosure are described in detail above. A Method performed by each of the above described devices according to the embodiments of the present disclosure is described in detail hereinafter.

5. Fourth Embodiment

Next, a method performed by a frequency spectrum management device according to the present disclosure is described in detail. The frequency spectrum management device may be the frequency spectrum management device 200 in the first embodiment, and thus all embodiments of the frequency spectrum management device 200 in the first embodiment are applicable in this embodiment.

Figure 15:
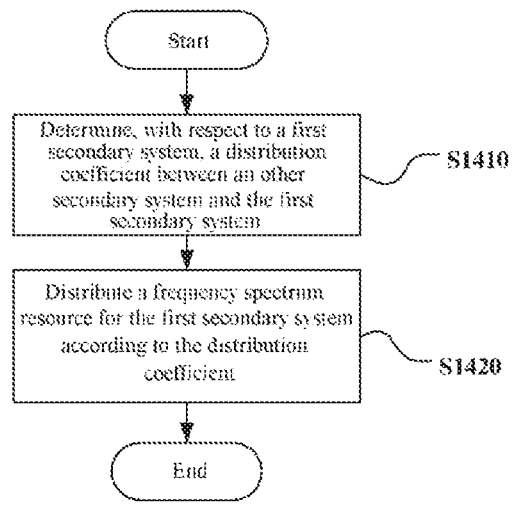
FIG. 15 is a flowchart showing a method performed by a frequency spectrum management device according to an embodiment of the present disclosure.

FIG. 15 is a flowchart showing a method performed by a frequency spectrum management device according to an embodiment of the present disclosure.

As shown in FIG. 15, in step S1410, with respect to a first secondary system managed by the frequency spectrum management device, a distribution coefficient between an other secondary system and the first secondary system is determined according to distances from the first secondary system and the other secondary system to a primary system. The distribution coefficient represents an interference degree of aggregation interference generated by the other secondary system and the first secondary system against the primary system.

Next, in step S1420, a frequency spectrum resource is distributed for the first secondary system according to the distribution coefficient.

Preferably, distributing the frequency spectrum resource for the first secondary system may include: distributing, for the first secondary system and the other secondary system, frequency spectrum resources that are orthogonal in frequency in a case that the distribution coefficient between the other secondary system and the first secondary system is greater than a specified threshold.

Preferably, the method further includes: determining the distances from the first secondary system and the other secondary system to the primary system according to distances from the first secondary system and the other secondary system to a reference point within coverage of the primary system.

Preferably, the reference point within the coverage of the primary system includes a first reference point corresponding to the first secondary system and a second reference point corresponding to the other secondary system, and the method further includes receiving first reference point information and second reference point information.

Preferably, the method further includes: determining a first interference degree according to distances from the first secondary system and the other secondary system to the first reference point; determining a second interference degree according to distances from the first secondary system and the other secondary system to the second reference point; and determining the distribution coefficient between the other secondary system and the first secondary system according to the first interference degree and the second interference degree.

Preferably, the first reference point and the second reference point are located within coverage of a same primary system.

Preferably, the first reference point and the second reference point are located within coverage of different primary systems.

Preferably, the method further includes receiving the first reference point information from a geographic location database in a region where the frequency spectrum management device is located.

Preferably, the method further includes determining the other secondary system according to geographic location information.

Preferably, the other secondary system includes one or more other secondary systems, and determining the distribution coefficient between the other secondary system and the first secondary system includes: determining a distribution coefficient between each of the one or more other secondary systems and the first secondary system.

Preferably, the other secondary system includes one or more secondary systems which cause interference to the primary system in a region where the frequency spectrum management device is located and which are managed by an other frequency spectrum management device except the frequency spectrum management device.

Preferably, the method further includes receiving the second reference point information from the other frequency spectrum management device except the frequency spectrum management device.

Preferably, the method further includes receiving the distribution coefficient between the other secondary system and the first secondary system from the other frequency spectrum management device.

Preferably, the method further includes transmitting location information of the first secondary system to the other frequency spectrum management device.

Preferably, the other secondary system further includes one or more secondary systems managed by the frequency spectrum management device.

Preferably, the method further includes receiving the second reference point information from a geographic location database in a region where the frequency spectrum management device is located.

Preferably, the method further includes transmitting the distributed frequency spectrum resource to the first secondary system.

The method performed by a frequency spectrum management device according to the embodiment of the present disclosure has been described in detail in the first embodiment, and details thereof are not described herein again.

6. Fifth Embodiment

Next, a method performed by an electronic device including a geographic location database according to the present disclosure is described in detail. The electronic device may be the electronic device 1000 in the second embodiment, and thus all embodiments of the electronic device 1000 in the second embodiment are applicable in this embodiment.

Figure 16:
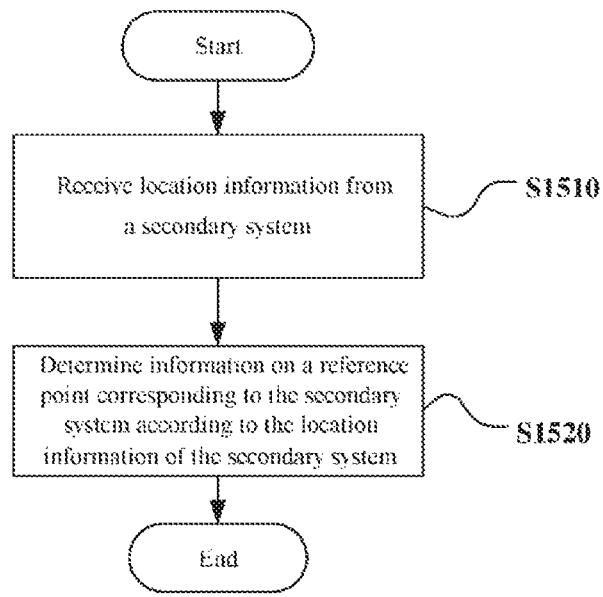
FIG. 16 is a flowchart showing a method performed by an electronic device according to an embodiment of the present disclosure.

FIG. 16 is a flowchart showing a method performed by an electronic device including a geographic location database according to an embodiment of the present disclosure.

As shown in FIG. 16, in step S1510, location information is received from a secondary system in a region where the electronic device 1000 is located.

Next, in step S1520, information on a reference point corresponding to the secondary system is determined according to the location information of the secondary system.

Preferably, the method further includes: transmitting the information on the reference point corresponding to the secondary system to a frequency spectrum management device in the region where the electronic device 1000 is located.

Preferably, the reference point corresponding to the secondary system may be the most severely interfered point within coverage of one or more primary systems that are interfered by the secondary system.

Preferably, the reference point corresponding to the secondary system may be a point closest to the secondary system within coverage of one or more primary systems that are interfered by the secondary system.

Preferably, the reference point corresponding to the secondary system may be an edge position of one or more primary systems that are interfered by the secondary system, with the minimum amount of interference that can further be tolerated.

The method performed by an electronic device including a geographic location database according to the embodiment of the present disclosure has been described in detail in the second embodiment, and details thereof are not described herein again.

7. Sixth Embodiment

Next, a method performed by an electronic device for a secondary system according to the present disclosure is described in detail. The electronic device may be the electronic device 1200 in the third embodiment, and thus all embodiments of the electronic device 1200 in the third embodiment are applicable in this embodiment.

Figure 17:
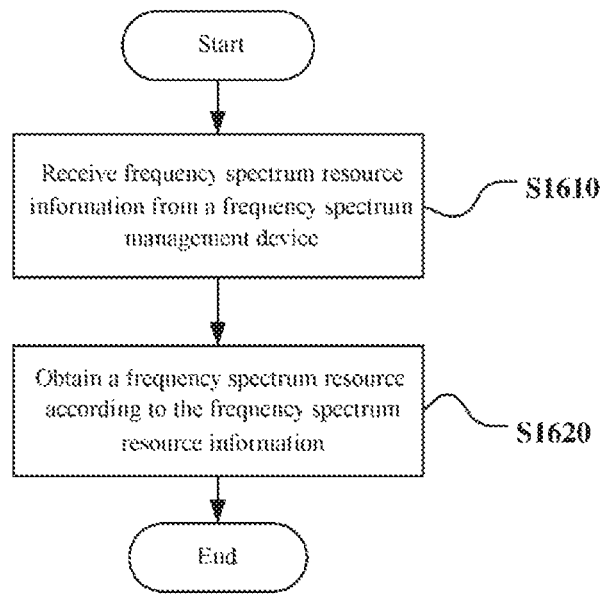
FIG. 17 is a flowchart showing a method performed by an electronic device for a secondary system according to an embodiment of the present disclosure.

FIG. 17 is a flowchart showing a method performed by an electronic device for a secondary system according to an embodiment of the present disclosure.

As shown in FIG. 17, in step S1610, frequency spectrum resource information is received from a frequency spectrum management device managing the secondary system. The frequency spectrum resource is distributed by the frequency spectrum management device for the electronic device according to a distribution coefficient between an other secondary system and the secondary system where the electronic device is located. The distribution coefficient is determined according to distances from the other secondary system and the secondary system where the electronic device is located to a primary system, and the distribution coefficient represents an interference degree of aggregation interference generated by the other secondary system and the secondary system where the electronic device is located against the primary system.

Next, in step S1620, a frequency spectrum resource is obtained according to the frequency spectrum resource information.

Preferably, the method further includes transmitting location information of the electronic device to a geographic location database in a region where the electronic device is located.

The method performed by an electronic device for a secondary system according to the embodiment of the present disclosure has been described in detail in the third embodiment, and details thereof are not described herein again.

8. Application Example

The technology of the present disclosure may be applied to various products. For example, each of the frequency spectrum management device 200 and the electronic device 1000 may be realized as any type of servers such as a tower server, a rack server, and a blade server. Each of the frequency spectrum management device 200 and the electronic device 1000 may be a control module (such as an integrated circuit module including a single wafer, and a card or a blade inserted into a slot of a blade server) installed on the server.

In a case that the electronic device 1200 applied in a secondary system is implemented as a base station device, the base station may be implemented as any type of eNB, such as a macro eNB and a small eNB. The small eNB may be an eNB covering a cell smaller than a macro cell, such as a pico eNB, a micro eNB and a home (femto) eNB. Alternatively, the base station may be implemented as any other type of base stations, such as a NodeB and a base transceiver station (BTS). The base station may include: a main body (which is also referred to as a base station device) configured to control wireless communication; and one or more remote radio heads (RRH) located at positions different from the main body. In addition, various types of terminals described below each may operate as a base station 200 by temporarily or semi-persistently performing functions of the base station.

In a case that the electronic device 1200 applied in a secondary system is implemented as a terminal device, the terminal device may be implemented as a mobile terminal (such as a smart phone, a tablet personal computer (PC), a notebook PC, a portable game terminal, a portable/dongle mobile router and a digital camera) or an in-vehicle terminal (such as a car navigation device). The terminal device 300 may also be implemented as a terminal (which is also referred to as a machine type communication (MTC) terminal) that performs machine-to-machine (M2M) communication. In addition, the terminal device may be a wireless communication module (such as an integrated circuit module including a single wafer) installed on each of the terminals.

[8-1. Application Example on Server]

Figure 18:
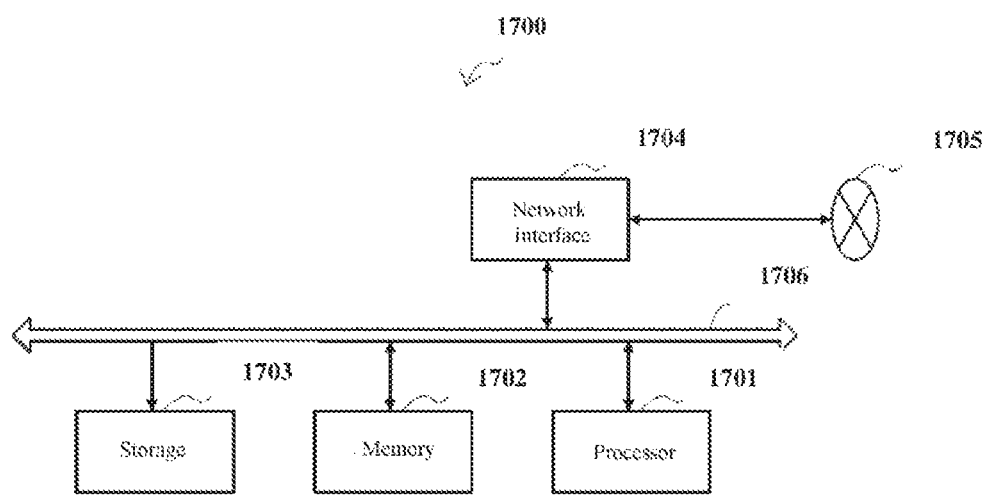
FIG. 18 is a block diagram showing a schematic configuration example of a server.

FIG. 18 is a block diagram showing an example of a server 1700 for implementing the frequency spectrum management device 200 and the electronic device 1000 according to the present disclosure. The server 1700 includes a processor 1701, a memory 1702, a storage 1703, a network interface 1704, and a bus 1706.

The processor 1701 may be, for example, a central processing unit (CPU) or a digital signal processor (DSP), and controls functions of the server 1700. The memory 1702 includes a random access memory (RAM) and a read-only memory (ROM), and stores a program that is executed by the processor 1701 and data. The storage 1703 may include a storage medium such as a semiconductor memory and a hard disk.

The network interface 1704 is a wired communication interface for connecting the server 1700 to a wired communication network 1705. The wired communication network 1705 may be a core network such as an evolved packet core network (EPC) or a packet data network (PDN) such as the Internet.

The bus 1706 connects the processor 1701, the memory 1702, the storage 1703, and the network interface 1704 to each other. The bus 1706 may include two or more buses (such as a high speed bus and a low speed bus) having different speeds.

In the server 1700 shown in FIG. 18, the processing circuit 210 and the determining unit 211 and the distribution unit 212 in the processing circuit 210 described with reference to FIG. 2, the processing circuit 210 and the determining unit 211 and the distribution unit 212 in the processing circuit 210 described with reference to FIG. 3, and the processing circuit 1010 described with reference to FIG. 10 may be implemented by the processor 1701, and the transceiving unit 220 described with reference to FIG. 3 may be implemented by the network interface 1704. For example, the processor 1701 may perform functions of determining the distribution coefficient, distributing the frequency spectrum resource and determining the reference point by executing instructions stored in the memory 1702 or the storage 1703.

[8-2. Application Example on Base Station]

First Application Example

Figure 19:
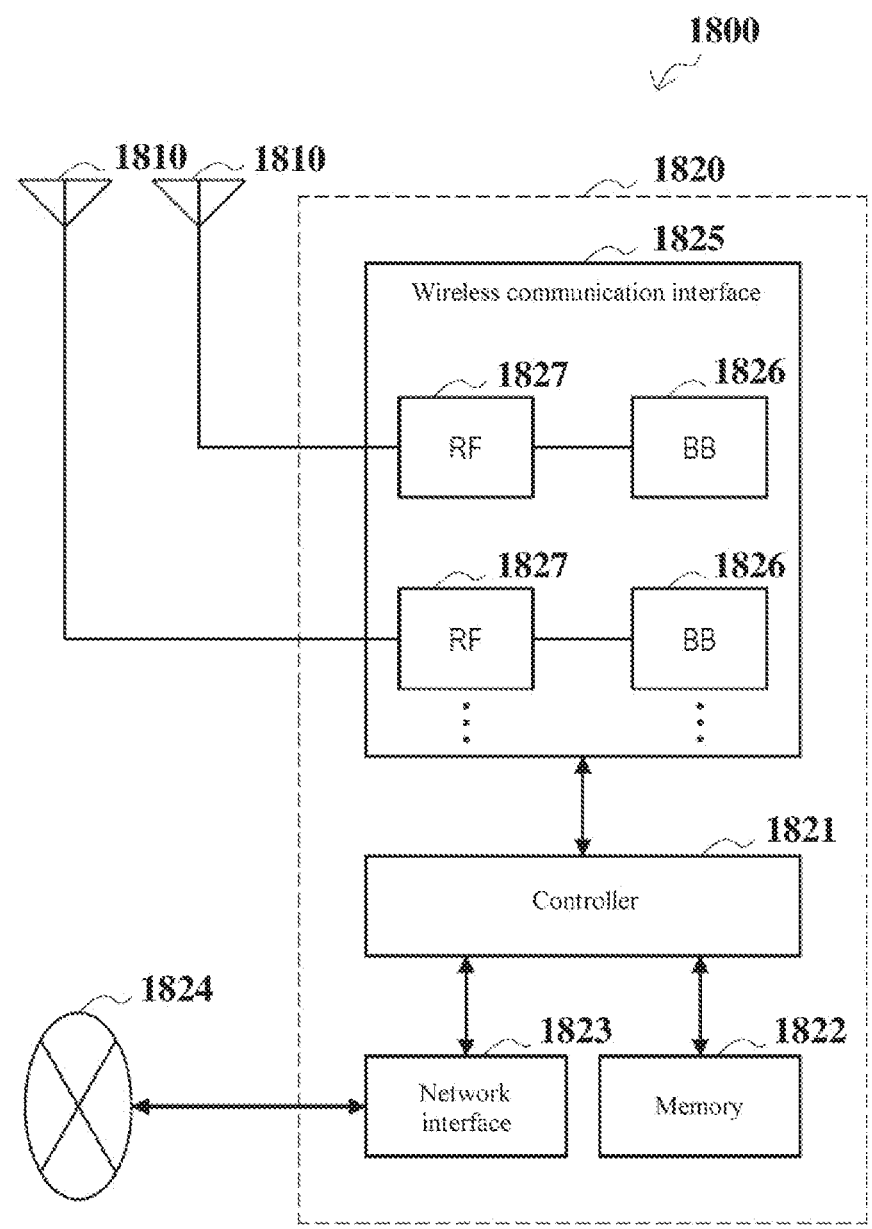
FIG. 19 is a block diagram showing a first schematic configuration example of an evolved Node B (eNB)

FIG. 19 is a block diagram showing a first schematic configuration example of an eNB to which the technology of the present disclosure may be applied. An eNB 1800 includes one or more antennas 1810 and a base station device 1820. The base station device 1820 and each antenna 1810 may be connected to each other via an RF cable.

Each of the antennas 1810 includes a single or multiple antenna elements (such as multiple antenna elements included in a multiple-input multiple-output (MIMO) antenna), and is used for the base station device 1820 to transmit and receive wireless signals. As shown in FIG. 19, the eNB 1800 may include the multiple antennas 1810. For example, the multiple antennas 1810 may be compatible with multiple frequency bands used by the eNB 1800. Although FIG. 19 shows the example in which the eNB 1800 includes the multiple antennas 1810, the eNB 1800 may also include a single antenna 1810.

The base station device 1820 includes a controller 1821, a memory 1822, a network interface 1823, and a wireless communication interface 1825.

The controller 1821 may be, for example, a CPU or a DSP and operates various functions of a higher layer of the base station device 1820. For example, the controller 1821 generates a data packet from data in a signal processed by the wireless communication interface 1825, and transfers the generated packet via the network interface 1823. The controller 1821 may bundle data from multiple base band processors to generate the bundled packet, and transfer the generated bundled packet. The controller 1821 may have logical functions of performing control such as radio resource control, radio bearer control, mobility management, admission control and scheduling. The control may be performed in corporation with an eNB or a core network node in the vicinity. The memory 1822 includes a RAM and a ROM, and stores a program executed by the controller 1821, and various types of control data (such as a terminal list, transmission power data, and scheduling data).

The network interface 1823 is a communication interface for connecting the base station device 1820 to a core network 1824. The controller 1821 may communication with a core network node or another eNB via the network interface 1823. In this case, the eNB 1800 and the core network node or the another eNB may be connected to each other via a logical interface (such as an S1 interface and an X2 interface). The network interface 1823 may also be a wired communication interface or a wireless communication interface for wireless backhaul. If the network interface 1823 is a wireless communication interface, the network interface 1823 may use a higher frequency band for wireless communication than a frequency band used by the wireless communication interface 1825.

The wireless communication interface 1825 supports any cellular communication scheme (such as long term evolution (LTE) and LTE-advanced), and provides wireless connection to a terminal located in a cell of the eNB 1800 via the antenna 1810. The wireless communication interface 1825 may typically include, for example, a BB processor 1826 and an RF circuit 1827. The BB processor 1826 may perform, for example, encoding/decoding, modulating/demodulating, and multiplexing/demultiplexing, and perform various types of signal processing of layers (such as L1, medium access control (MAC), radio link control (RLC) and a packet data convergence protocol (PDCP)). The BB processor 1826 may have a part or all of the above logical functions instead of the controller 1821. The BB processor 1826 may be a memory that stores a communication control program, or a module that includes a processor and a related circuit configured to execute the program. Updating the program may allow the functions of the BB processor 1826 to be changed. The module may be a card or a blade that is inserted into a slot of the base station device 1820. Alternatively, the module may also be a chip that is installed on the card or the blade. Meanwhile, the RF circuit 1827 may include, for example, a mixer, a filter, and an amplifier, and transmits and receives wireless signals via the antenna 1810.

As shown in FIG. 19, the wireless communication interface 1825 may include the multiple BB processors 1826. For example, the multiple BB processors 1826 may be compatible with multiple frequency bands used by the eNB 1800. As shown in FIG. 19, the wireless communication interface 1825 may include the multiple RF circuits 1827. For example, the multiple RF circuits 1827 may be compatible with multiple antenna elements. Although FIG. 18 shows the example in which the wireless communication interface 1825 includes the multiple BB processors 1826 and the multiple RF circuits 1827, the wireless communication interface 1825 may also include a single BB processor 1826 or a single RF circuit 1827.

Second Application Example

Figure 20:
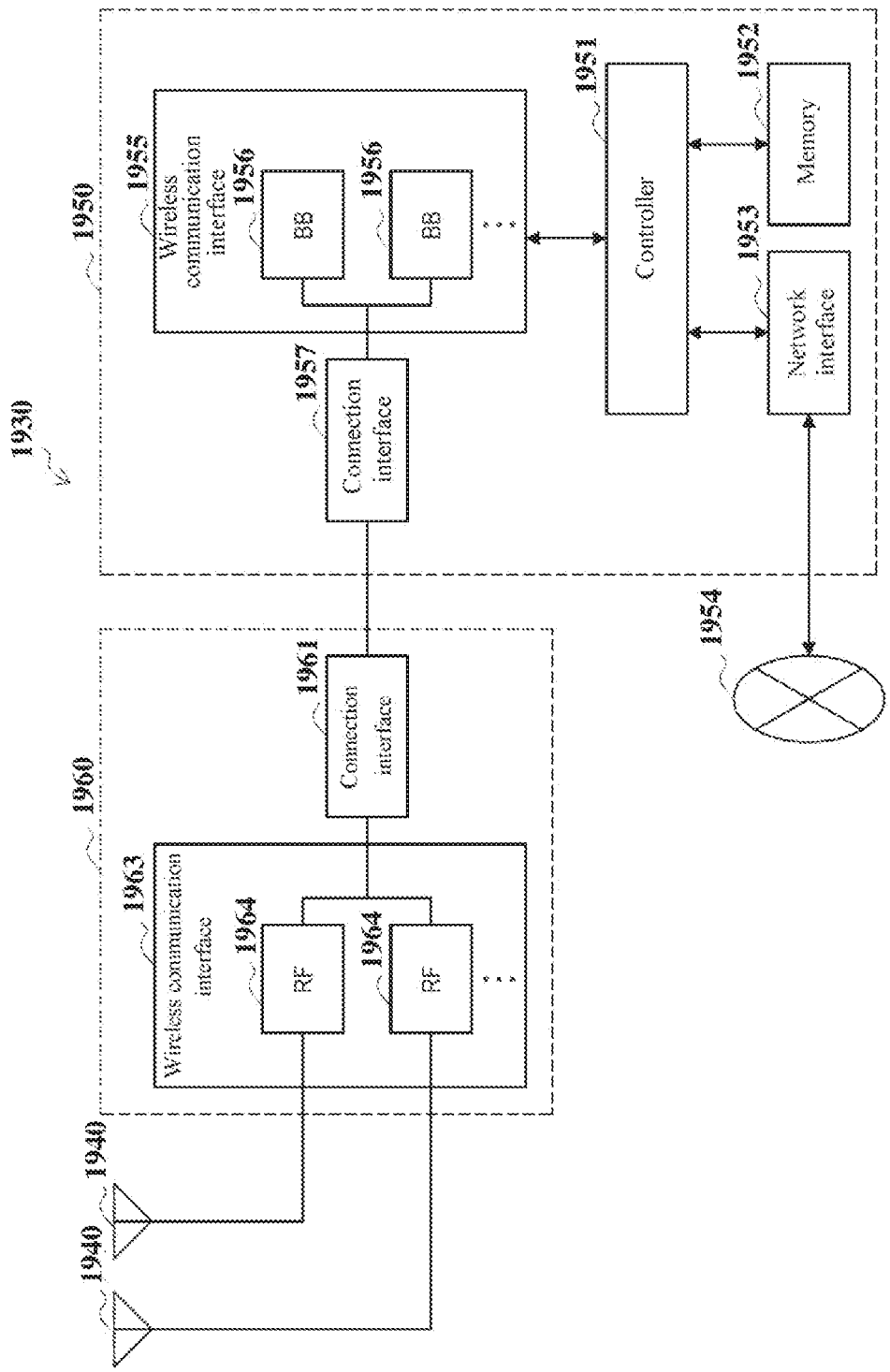
FIG. 20 is a block diagram showing a second schematic configuration example of the eNB.

FIG. 20 is a block diagram showing a second schematic configuration example of an eNB to which the technology of the present disclosure may be applied. An eNB 1930 includes one or more antennas 1940, a base station device 1950, and an RRH 1960. The RRH 1960 and each antenna 1940 may be connected to each other via an RF cable. The base station device 1950 and the RRH 1960 may be connected to each other via a high speed line such as an optical fiber cable.

Each of the antennas 1940 includes a single or multiple antenna elements (such as multiple antenna elements included in an MIMO antenna), and is used for the RRH 1960 to transmit and receive wireless signals. As shown in FIG. 20, the eNB 1930 may include the multiple antennas 1940. For example, the multiple antennas 1940 may be compatible with multiple frequency bands used by the eNB 1930. Although FIG. 20 shows the example in which the eNB 1930 includes the multiple antennas 1940, the eNB 1930 may also include a single antenna 1940.

The base station device 1950 includes a controller 1951, a memory 1952, a network interface 1953, a wireless communication interface 1955, and a connection interface 1957. The controller 1951, the memory 1952, and the network interface 1953 are the same as the controller 1821, the memory 1822, and the network interface 1823 described with reference to FIG. 19.

The wireless communication interface 1955 supports any cellular communication scheme (such as LTE and LTE-Advanced) and provides wireless communication to a terminal located in a sector corresponding to the RRH 1960 via the RRH 1960 and the antenna 1940. The wireless communication interface 1955 may typically include, for example, a BB processor 1956. The BB processor 1956 is the same as the BB processor 1826 described with reference to FIG. 19, except the BB processor 1956 is connected to an RF circuit 1964 of the RRH 1960 via the connection interface 1957. As show in FIG. 20, the wireless communication interface 1955 may include the multiple BB processors 1956. For example, the multiple BB processors 1956 may be compatible with multiple frequency bands used by the eNB 1930. Although FIG. 20 shows the example in which the wireless communication interface 1955 includes the multiple BB processors 1956, the wireless communication interface 1955 may also include a single BB processor 1956.

The connection interface 1957 is an interface for connecting the base station device 1950 (wireless communication interface 1955) to the RRH 1960. The connection interface 1957 may also be a communication module for communication in the above-described high speed line that connects the base station device 1950 (wireless communication interface 1955) to the RRH 1960.

The RRH 1960 includes a connection interface 1961, and a wireless communication interface 1963.

The connection interface 1961 is an interface for connecting the RRH 1960 (wireless communication interface 1963) to the base station device 1950. The connection interface 1961 may also be a communication module for communication in the above-described high speed line.

The wireless communication interface 1963 transmits and receives wireless signals via the antenna 1940. The wireless communication interface 1963 may typically include, for example, the RF circuit 1964. The RF circuit 1964 may include, for example, a mixer, a filter, and an amplifier, and transmits and receives wireless signals via the antenna 1940. As shown in FIG. 20, the wireless communication interface 1963 may include multiple RF circuits 1964. For example, the multiple RF circuits 1964 may support multiple antenna elements. Although FIG. 20 shows the example in which the wireless communication interface 1963 includes the multiple RF circuits 1964, the wireless communication interface 1963 may also include a single RF circuit 1964.

In the eNB 1800 shown in FIG. 19 and the eNB 1930 shown in FIG. 20, the processing circuit 1210 described with reference to FIG. 12 may be implemented by the controller 1821 and/or the controller 1951. At least a part of functions may be implemented by the controller 1821 and the controller 1951. For example, the controller 1821 and/or the controller 1951 may perform a function of obtaining the frequency spectrum resource by executing instructions stored in the corresponding memory.

[8-3. Application Example on Terminal Device]

First Application Example

Figure 21:
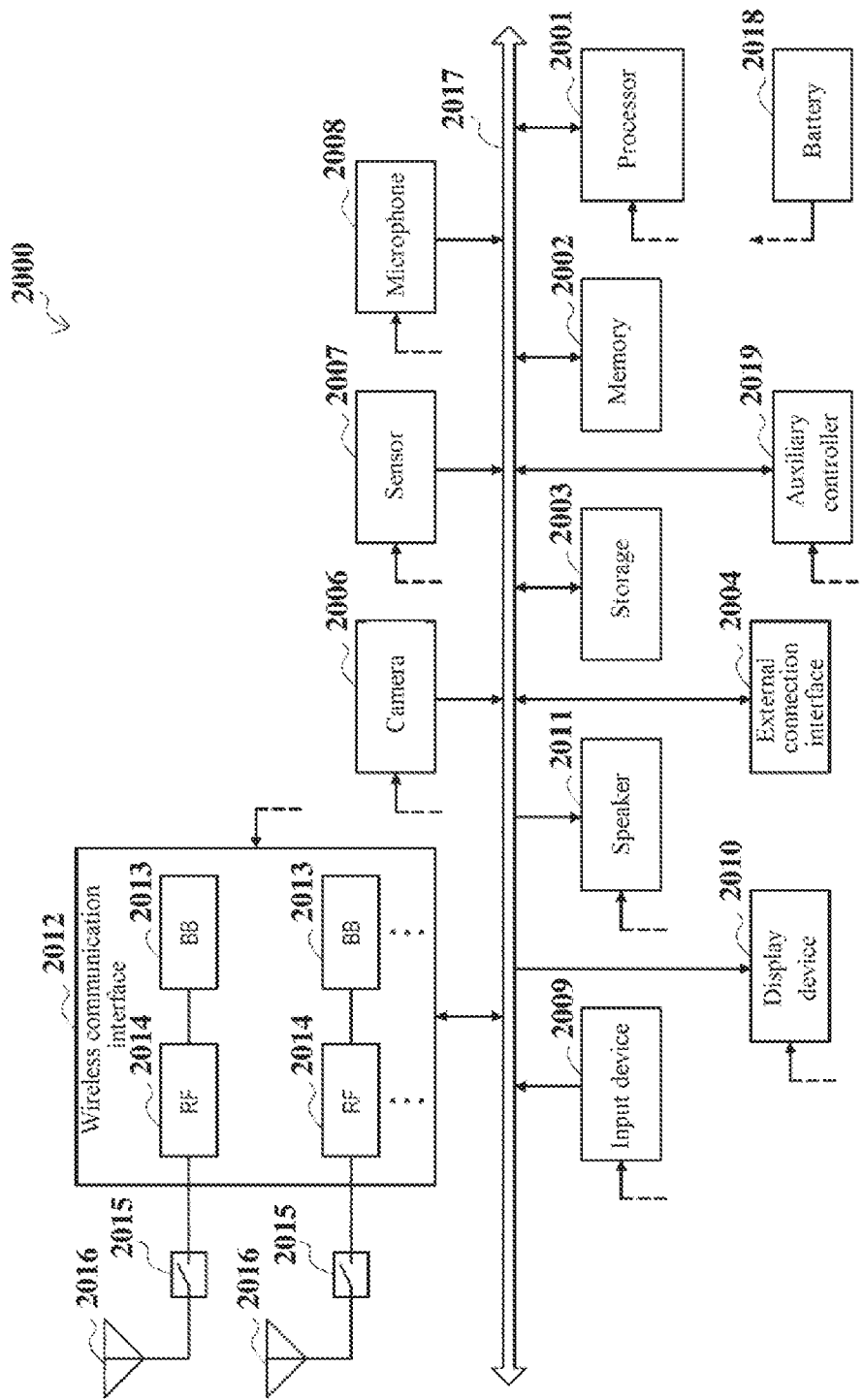
FIG. 21 is a block diagram showing a schematic configuration example of a smart phone.

FIG. 21 is a block diagram showing a schematic configuration example of a smart phone 2000 to which the technology of the present disclosure may be applied. The smart phone 2000 includes a processor 2001, a memory 2002, a storage 2003, an external connection interface 2004, a camera 2006, a sensor 2007, a microphone 2008, an input device 2009, a display device 2010, a speaker 2011, a wireless communication interface 2012, one or more antenna switches 2015, one or more antennas 2016, a bus 2017, a battery 2018, and an auxiliary controller 2019.

The processor 2001 may be, for example, a CPU or a system on a chip (SoC), and controls functions of an application layer and another layer of the smart phone 2000. The memory 2002 includes a RAM and a ROM, and stores a program that is executed by the processor 2001, and data. The storage 2003 may include a storage medium such as a semiconductor memory and a hard disk. The external connection interface 2004 is an interface for connecting an external device (such as a memory card and a universal serial bus (USB) device) to the smart phone 2000.

The camera 2006 includes an image sensor (such as a charge coupled device (CCD) and a complementary metal oxide semiconductor (CMOS)), and generates a captured image. The sensor 2007 may include a group of sensors such as a measurement sensor, a gyro sensor, a geomagnetic sensor, and an acceleration sensor. The microphone 2008 converts sounds that are inputted to the smart phone 2000 into audio signals. The input device 2009 includes, for example, a touch sensor configured to detect touch onto a screen of the display device 2010, a keypad, a keyboard, a button, or a switch, and receive an operation or information inputted from a user. The display device 2010 includes a screen (such as a liquid crystal display (LCD) and an organic light-emitting diode (OLED) display), and displays an output image of the smart phone 2000. The speaker 2011 converts audio signals that are outputted from the smart phone 2000 to sounds.

The wireless communication interface 2012 supports any cellular communication scheme (such as LTE and LTE-Advanced), and performs wireless communication. The wireless communication interface 2012 may typically include, for example, a BB processor 2013 and an RF circuit 2014. The BB processor 2013 may perform, for example, encoding/decoding, modulating/demodulating, and multiplexing/demultiplexing, and performs various types of signal processing for wireless communication. Meanwhile, the RF circuit 2014 may include, for example, a mixer, a filter, and an amplifier, and transmits and receives wireless signals via the antenna 2016. The wireless communication interface 2012 may be a chip module having the BB processor 2013 and the RF circuit 2014 integrated thereon. As shown in FIG. 21, the wireless communication interface 2012 may include multiple BB processors 2013 and multiple RF circuits 2014. Although FIG. 21 shows the example in which the wireless communication interface 2012 includes the multiple BB processors 2013 and the multiple RF circuits 2014, the wireless communication interface 2012 may also include a single BB processor 2013 or a single RF circuit 2014.

Furthermore, in addition to a cellular communication scheme, the wireless communication interface 2012 may support another type of wireless communication scheme such as a short-distance wireless communication scheme, a near field communication scheme, and a wireless local area network (LAN) scheme. In this case, the wireless communication interface 2012 may include the BB processor 2013 and the RF circuit 2014 for each wireless communication scheme.

Each of the antenna switches 2015 switches connection destinations of the antennas 2016 among multiple circuits (such as circuits for different wireless communication schemes) included in the wireless communication interface 2012.

Each of the antennas 2016 includes a single or multiple antenna elements (such as multiple antenna elements included in an MIMO antenna), and is used for the wireless communication interface 2012 to transmit and receive wireless signals. As shown in FIG. 21, the smart phone 2000 may include the multiple antennas 2016. Although FIG. 21 illustrates the example in which the smart phone 2000 includes the multiple antennas 2016, the smart phone 2000 may also include a single antenna 2016.

Furthermore, the smart phone 2000 may include the antenna 2016 for each wireless communication scheme. In this case, the antenna switches 2015 may be omitted from the configuration of the smart phone 2000.

The bus 2017 connects the processor 2001, the memory 2002, the storage 2003, the external connection interface 2004, the camera 2006, the sensor 2007, the microphone 2008, the input device 2009, the display device 2010, the speaker 2011, the wireless communication interface 2012, and the auxiliary controller 2019 to each other. The battery 2018 supplies power to blocks of the smart phone 2000 shown in FIG. 21 via feeder lines that are partially shown as dashed lines in FIG. 21. The auxiliary controller 2019 operates a minimum necessary function of the smart phone 2000, for example, in a sleep mode.

In the smart phone 2000 shown in FIG. 21, the processing circuit 1210 described with reference to FIG. 12 may be implemented by the processor 2001 or the auxiliary controller 2019. At least a part of functions may be implemented by the processor 2001 or the auxiliary controller 2019. For example, the processor 2001 or the auxiliary controller 2019 may perform a function of obtaining the frequency spectrum resource by executing instructions stored in the memory 2002 or the storage 2003.

Second Application Example

Figure 22:
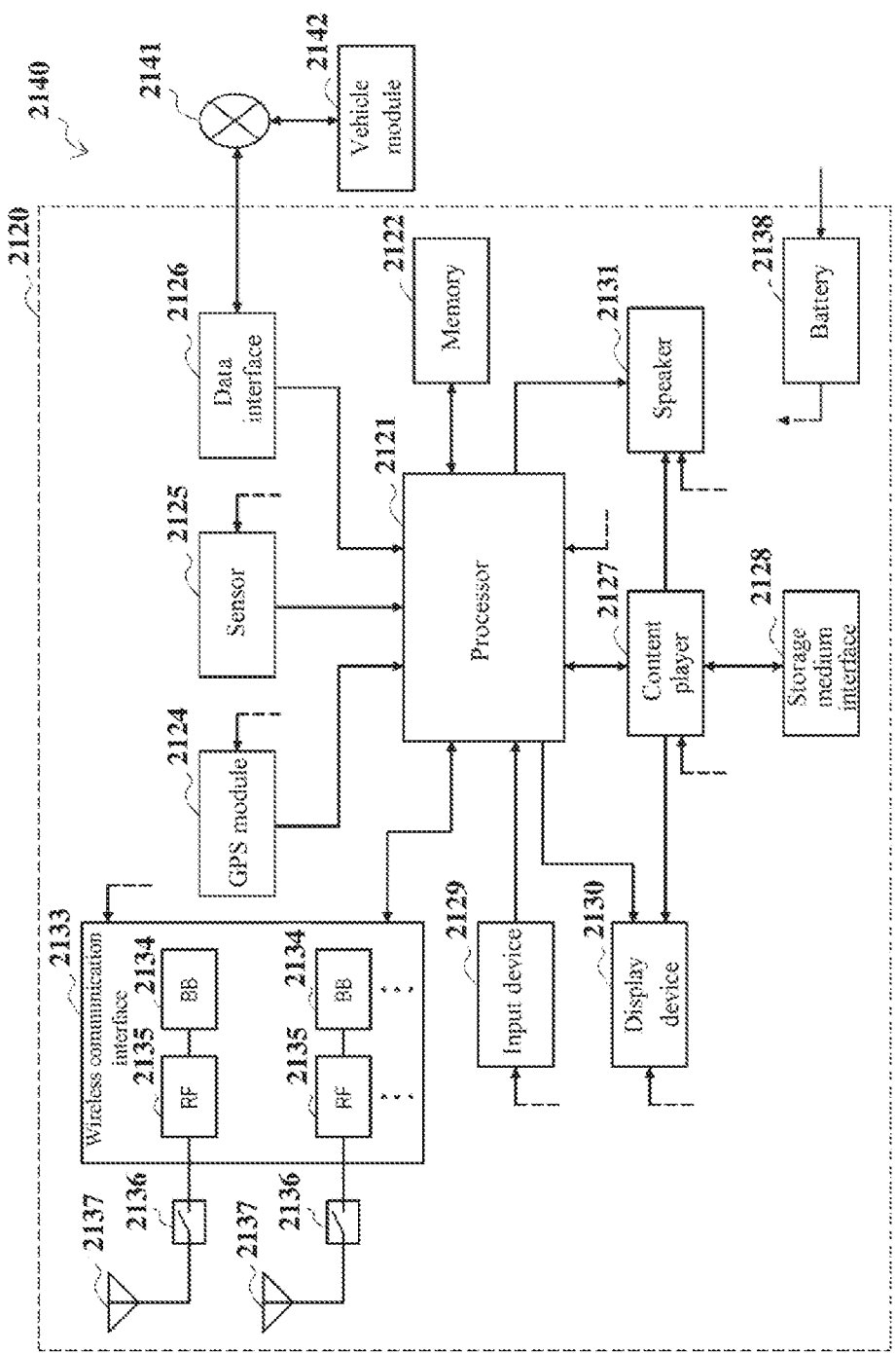
FIG. 22 is a block diagram showing a schematic configuration example of a car navigation device.

FIG. 22 is a block diagram showing a schematic configuration example of a car navigation device 2120 to which the technology of the present disclosure may be applied. The car navigation device 2120 includes a processor 2121, a memory 2122, a global positioning system (GPS) module 2124, a sensor 2125, a data interface 2126, a content player 2127, a storage medium interface 2128, an input device 2129, a display device 2130, a speaker 2131, a wireless communication interface 2133, one or more antenna switches 2136, one or more antennas 2137, and a battery 2138.

The processor 2121 may be, for example, a CPU or an SoC, and controls a navigation function and another function of the car navigation device 2120. The memory 2122 includes a RAM and a ROM, and stores a program that is executed by the processor 2121 and data.

The GPS module 2124 determines a position (such as latitude, longitude, and altitude) of the car navigation device 2120 by using GPS signals received from a GPS satellite. The sensor 2125 may include a group of sensors such as a gyro sensor, a geomagnetic sensor, and an air pressure sensor. The data interface 2126 is connected to, for example, an in-vehicle network 2141 via a terminal that is not shown, and acquires data (such as vehicle speed data) generated by the vehicle.

The content player 2127 reproduces content stored in a storage medium (such as a CD and a DVD) that is inserted into the storage medium interface 2128. The input device 2129 includes, for example, a touch sensor configured to detect touch onto a screen of the display device 2130, a button or a switch, and receives an operation or information inputted from a user. The display device 2130 includes a screen such as a LCD or an OLED display, and displays an image of the navigation function or content that is reproduced. The speaker 2131 outputs sounds of the navigation function or the content that is reproduced.

The wireless communication interface 2133 supports any cellular communication scheme (such as LTE and LTE-advanced), and performs wireless communication. The wireless communication interface 2133 may typically include, for example, a BB processor 2134 and an RF circuit 2135. The BB processor 2134 may perform, for example, encoding/decoding, modulating/demodulating, and multiplexing/demultiplexing, and performs various types of signal processing for wireless communication. Meanwhile, the RF circuit 2135 may include, for example, a mixer, a filter, and an amplifier, and transmits and receives wireless signals via the antenna 2137. The wireless communication interface 2133 may also be a chip module having the BB processor 2134 and the RF circuit 2135 integrated thereon. As shown in FIG. 22, the wireless communication interface 2133 may include the multiple BB processors 2134 and the multiple RF circuits 2135. Although FIG. 22 shows the example in which the wireless communication interface 2133 includes the multiple BB processors 2134 and the multiple RF circuits 2135, the wireless communication interface 2133 may also include a single BB processor 2134 or a single RF circuit 2135.

Furthermore, in addition to a cellular communication scheme, the wireless communication interface 2133 may support another type of wireless communication scheme such as a short-distance wireless communication scheme, a near field communication scheme, and a wireless LAN scheme. In that case, the wireless communication interface 2133 may include the BB processor 2134 and the RF circuit 2135 for each wireless communication scheme.

Each of the antenna switches 2136 switches connection destinations of the antennas 2137 among multiple circuits (such as circuits for different wireless communication schemes) included in the wireless communication interface 2133.

Each of the antennas 2137 includes a single or multiple antenna elements (such as multiple antenna elements included in an MIMO antenna), and is used for the wireless communication interface 2133 to transmit and receive wireless signals. As shown in FIG. 22, the car navigation device 2120 may include the multiple antennas 2137. Although FIG. 22 shows the example in which the car navigation device 2120 includes the multiple antennas 2137, the car navigation device 2120 may also include a single antenna 2137.

Furthermore, the car navigation device 2120 may include the antenna 2137 for each wireless communication scheme. In that case, the antenna switches 2136 may be omitted from the configuration of the car navigation device 2120.

The battery 2138 supplies power to blocks of the car navigation device 2120 shown in FIG. 22 via feeder lines that are partially shown as dashed lines in FIG. 22. The battery 2138 accumulates power supplied from the vehicle.

In the car navigation device 2120 shown in FIG. 22, the processing circuit 1210 described with reference to FIG. 12 may be implemented by the processor 2121. At least a part of functions may be implemented by the processor 2121. For example, the processor 2121 may perform a function of obtaining the frequency spectrum resource by executing instructions stored in the memory 2122.

The technology of the present disclosure may also be implemented as an in-vehicle system (or a vehicle) 2140 including one or more blocks of the car navigation device 2120, the in-vehicle network 2141 and a vehicle module 2142. The vehicle module 2142 generates vehicle data (such as a vehicle speed, an engine speed, or failure information), and outputs the generated data to the in-vehicle network 2141.

In the system and the method of the present disclosure, it is apparent that various components or steps may be decomposed and/or recombined. These decomposition and/or recombination should be regarded as equivalent solutions of the present disclosure. In addition, the steps performing a series of processing above may be performed in the describing order naturally, but it is not necessary. Some steps may be performed concurrently or independently with each other.

While the embodiments of the present disclosure have been described in detail with reference to the drawings, it should be understood that the above described embodiments are merely used to illustrate the present disclosure and are not intended to limit the present disclosure. For those skilled in the art, various modifications and variations may be made on the above described embodiments without departing from the essence and scope of the present disclosure. Accordingly, the scope of the present disclosure is defined only by the appended claims and equivalents thereof.

The invention claimed is:

1. A frequency spectrum management device, comprising a processing circuit configured to:
   determine, with respect to a first secondary system managed by the frequency spectrum management device, according to distances from the first secondary system and an other secondary system to a primary system, a distribution coefficient between the other secondary system and the first secondary system, the distribution coefficient representing an interference degree of aggregation interference generated by the other secondary system and the first secondary system against the primary system; and
   distribute a frequency spectrum resource for the first secondary system according to the distribution coefficient.

2. The frequency spectrum management device according to claim 1, wherein the processing circuit is configured to distribute non-overlapping frequency spectrum resources for the first secondary system and the other secondary system in a case that the distribution coefficient between the other secondary system and the first secondary system is greater than a specified threshold.

3. The frequency spectrum management device according to claim 1, wherein the processing circuit is configured to determine the distances from the first secondary system and the other secondary system to the primary system according to distances from the first secondary system and the other secondary system to a reference point.

4. The frequency spectrum management device according to claim 3, wherein the processing circuit further comprises a transceiving unit,
   the reference point comprises a first reference point corresponding to the first secondary system and a second reference point corresponding to the other secondary system, and
   the transceiving unit is configured to receive first reference point information and second reference point information.

5. The frequency spectrum management device according to claim 4, wherein the processing circuit is configured to:
   determine a first interference degree according to distances from the first secondary system and the other secondary system to the first reference point;
   determine a second interference degree according to distances from the first secondary system and the other secondary system to the second reference point; and
   determine the distribution coefficient between the other secondary system and the first secondary system according to the first interference degree and the second interference degree.

6. The frequency spectrum management device according to claim 4, wherein the first reference point and the second reference point are located within coverage of different primary systems.

7. The frequency spectrum management device according to claim 4, wherein the transceiving unit is configured to receive the first reference point information from a geographic location database in a region where the frequency spectrum management device is located.

8. The frequency spectrum management device according to claim 4, wherein the processing circuit is configured to determine the other secondary system according to geographic location information.

9. The frequency spectrum management device according to claim 4, wherein the processing circuit is configured to determine a distribution coefficient between each of one or more other secondary systems and the first secondary system.

10. The frequency spectrum management device according to claim 1, wherein the other secondary system comprises one or more secondary systems which cause interference to the primary system in a region where the frequency spectrum management device is located and which are managed by an other frequency spectrum management device except the frequency spectrum management device, and
    the processing circuit further comprises a transceiving unit configured to receive a second reference point information from the other frequency spectrum management device except the frequency spectrum management device.

11. The frequency spectrum management device according to claim 1, wherein the other secondary system comprises one or more secondary systems which cause interference to the primary system in a region where the frequency spectrum management device is located and which are managed by an other frequency spectrum management device except the frequency spectrum management device, and
    the processing circuit further comprises a transceiving unit configured to receive the distribution coefficient between the other secondary system and the first secondary system from the other frequency spectrum management device.

12. The frequency spectrum management device according to claim 11, wherein the transceiving unit is configured to transmit location information of the first secondary system to the other frequency spectrum management device.

13. The frequency spectrum management device according to claim 4, wherein the transceiving unit is configured to receive the second reference point information from a geographic location database in a region where the frequency spectrum management device is located.

14. An electronic device for a secondary system, the electronic device comprising a processing circuit configured to:
    receive frequency spectrum resource information from a frequency spectrum management device managing the secondary system; and obtain a frequency spectrum resource according to the frequency spectrum resource information, wherein the frequency spectrum resource is distributed by the frequency spectrum management device for the electronic device according to a distribution coefficient between the secondary system where the electronic device is located and an other secondary system, the distribution coefficient is determined according to distances from the secondary system where the electronic device is located and the other secondary system to a primary system, and the distribution coefficient represents an interference degree of aggregation interference generated by the secondary system where the electronic device is located and the other secondary system against the primary system.

15. The electronic device according to claim 14, wherein the processing circuit is configured to transmit location information of the electronic device to a geographic location database in a region where the electronic device is located.

16. A method performed by a frequency spectrum management device, comprising:

determining, with respect to a first secondary system managed by the frequency spectrum management device, according to distances from the first secondary system and an other secondary system to a primary system, a distribution coefficient between the other secondary system and the first secondary system, the distribution coefficient representing an interference degree of aggregation interference generated by the other secondary system and the first secondary system against the primary system; and distributing a frequency spectrum resource for the first secondary system according to the distribution coefficient.

17. A method performed by an electronic device for a secondary system, comprising:

receiving frequency spectrum resource information from a frequency spectrum management device managing the secondary system; and obtaining a frequency spectrum resource according to the frequency spectrum resource information, wherein the frequency spectrum resource is distributed by the frequency spectrum management device for the electronic device according to a distribution coefficient between the secondary system where the electronic device is located and an other secondary system, the distribution coefficient is determined according to distances from the secondary system where the electronic device is located and the other secondary system to a primary system, and the distribution coefficient represents an interference degree of aggregation interference generated by the secondary system where the electronic device is located and the other secondary system against the primary system.

* * * * *